US012634413B2

(12) United States Patent　　　　　(10) Patent No.:　US 12,634,413 B2
Krol et al.　　　　　　　　　　　　　　(45) Date of Patent:　　May 19, 2026

(54) TWO-DIMENSIONAL VIEW OF A PRESENTATION IN A THREE-DIMENSIONAL VIDEOCONFERENCING ENVIRONMENT

(71) Applicant: Katmai Tech Inc., New York, NY (US)

(72) Inventors: Gerard Cornelis Krol, Leiden (NL); Erik Stuart Braund, Saugerties, NY (US); James Donahower, Harvey Cedars, NJ (US); Petr Polyakov, Tampa, FL (US)

(73) Assignee: KATMAI TECH INC., New York, NY (US)

( * ) Notice: Subject to any disclaimer, the term of this patent is extended or adjusted under 35 U.S.C. 154(b) by 266 days.

(21) Appl. No.: 17/813,708

(22) Filed: Jul. 20, 2022

(65) Prior Publication Data

US 2024/0031531 A1　　Jan. 25, 2024

(51) Int. Cl.
　　*H04N 7/15*　　　　(2006.01)
　　*G06F 3/14*　　　　(2006.01)
(52) U.S. Cl.
　　CPC ........... *H04N 7/157* (2013.01); *G06F 3/1454* (2013.01)
(58) Field of Classification Search
　　None
　　See application file for complete search history.

(56) References Cited

U.S. PATENT DOCUMENTS 6,215,498 B1　4/2001　Filo et al.
6,559,863 B1　5/2003　Megiddo
6,583,808 B2　6/2003　Boulanger et al.
6,853,398 B2　2/2005　Malzbender et al.
7,197,126 B2　3/2007　Kanada
(Continued)

FOREIGN PATENT DOCUMENTS

CN　　103580881 A　　2/2014
CN　　105487657 A　　4/2016
(Continued)

OTHER PUBLICATIONS

Roach, "Mesh for Microsoft Teams aims to make collaboration in the 'metaverse' personal and fun," Nov. 2, 2021, https://news.microsoft.com/source/features/innovation/mesh-for-microsoft-teams/.*

(Continued)

*Primary Examiner* — Ryan Barrett
(74) *Attorney, Agent, or Firm* — Sterne, Kessler, Goldstein & Fox P.L.L.C.

(57)　　　　ABSTRACT

Disclosed herein is a web-based videoconference system that allows for two-dimensional screen sharing within the virtual environment. In some embodiments, data specifying a three-dimensional virtual space. The three-dimensional virtual space comprises a plurality of participants and an avatar representing each of the plurality of participants. A presentation stream is received from a first client device of a first participant. The presentation stream is mapped onto a three-dimensional model of a presentation screen in the three-dimensional virtual space. A selection of the presentation screen is received from a second participant. A two-dimensional view of the presentation stream is rendered to the second participant.

20 Claims, 14 Drawing Sheets

(56) References Cited

U.S. PATENT DOCUMENTS

| | | | |
|---|---|---|---|
| 7,346,654 | B1 | 3/2008 | Weiss |
| 7,634,073 | B2 | 12/2009 | Kanada |
| 7,840,668 | B1 | 11/2010 | Sylvain et al. |
| 8,072,479 | B2 | 12/2011 | Valliath et al. |
| 8,279,254 | B2 | 10/2012 | Goose et al. |
| 8,403,751 | B2 | 3/2013 | Boustead et al. |
| 8,520,872 | B2 | 8/2013 | Jang et al. |
| 8,620,009 | B2 | 12/2013 | Zhang et al. |
| 9,041,764 | B2 | 5/2015 | Wang et al. |
| 9,218,685 | B2 | 12/2015 | Piemonte et al. |
| 9,305,319 | B2 | 4/2016 | Maor et al. |
| 9,384,594 | B2 | 7/2016 | Maciocci et al. |
| 9,420,229 | B2 | 8/2016 | Pourashraf et al. |
| 9,565,316 | B2 | 2/2017 | Gleim |
| 9,607,428 | B2 | 3/2017 | Li |
| 9,656,168 | B1 | 5/2017 | Bear et al. |
| 9,661,274 | B2 | 5/2017 | Kubota et al. |
| 9,743,044 | B2 | 8/2017 | Safaei et al. |
| 9,910,509 | B2 | 3/2018 | Markovic et al. |
| 10,013,805 | B2 | 7/2018 | Barzuza et al. |
| 10,155,164 | B2 | 12/2018 | Boustead et al. |
| 10,304,238 | B2 | 5/2019 | Cooper et al. |
| 10,304,239 | B2 | 5/2019 | Gorur Sheshagiri et al. |
| 10,334,384 | B2 | 6/2019 | Sun et al. |
| 10,356,216 | B2 | 7/2019 | Khalid et al. |
| 10,491,946 | B2 | 11/2019 | Tillman et al. |
| 10,573,071 | B2 | 2/2020 | Sun et al. |
| 10,609,334 | B2 | 3/2020 | Li |
| 10,679,411 | B2 | 6/2020 | Ziman |
| 10,979,672 | B1 | 4/2021 | Krol et al. |
| 11,057,351 | B1 | 7/2021 | Simanel et al. |
| 11,095,857 | B1 * | 8/2021 | Krol ......... H04S 7/303 |
| 11,457,178 | B2 * | 9/2022 | Krol ......... A63F 13/213 |
| 2002/0158873 | A1 | 10/2002 | Williamson |
| 2007/0274528 | A1 | 11/2007 | Nakamoto et al. |
| 2009/0113314 | A1 | 4/2009 | Dawson et al. |
| 2009/0172557 | A1 * | 7/2009 | Muta ......... G06F 3/1423 |
| | | | 715/740 |
| 2009/0254843 | A1 * | 10/2009 | Van Wie ......... H04L 67/131 |
| | | | 707/999.005 |
| 2011/0072367 | A1 | 3/2011 | Bauer |
| 2013/0321564 | A1 | 12/2013 | Smith et al. |
| 2014/0033078 | A1 * | 1/2014 | Goldman ......... G06Q 30/02 |
| | | | 715/757 |
| 2014/0040783 | A1 | 2/2014 | Goldman et al. |
| 2014/0058807 | A1 | 2/2014 | Altberg et al. |
| 2015/0302661 | A1 | 10/2015 | Miller |
| 2016/0300387 | A1 * | 10/2016 | Ziman ......... G06F 3/165 |
| 2017/0351476 | A1 | 12/2017 | Yoakum |
| 2019/0199993 | A1 | 6/2019 | Babu J D et al. |
| 2019/0310761 | A1 | 10/2019 | Agarawala et al. |
| 2019/0320144 | A1 | 10/2019 | Tong et al. |
| 2019/0354170 | A1 | 11/2019 | Rosedale |
| 2019/0371060 | A1 | 12/2019 | Energin et al. |
| 2020/0008003 | A1 | 1/2020 | Thompson et al. |
| 2020/0037091 | A1 | 1/2020 | Jeon et al. |
| 2020/0098191 | A1 | 3/2020 | McCall |
| 2020/0221247 | A1 | 7/2020 | Latypov et al. |
| 2020/0294312 | A1 | 9/2020 | Ziman |
| 2021/0248803 | A1 | 8/2021 | Kojima et al. |
| 2022/0070232 | A1 * | 3/2022 | Young ......... G06T 19/003 |
| 2022/0086203 | A1 * | 3/2022 | Morris ......... H04L 65/403 |
| 2022/0124130 | A1 * | 4/2022 | Punwani ......... H04N 7/157 |
| 2022/0124140 | A1 * | 4/2022 | Okina ......... G06V 40/20 |
| 2022/0277528 | A1 * | 9/2022 | Funazukuri ......... G06F 3/013 |
| 2023/0128659 | A1 * | 4/2023 | Krol ......... H04N 21/44 |
| | | | 345/423 |

FOREIGN PATENT DOCUMENTS

| | | | |
|---|---|---|---|
| CN | 103888714 | B | 4/2017 |
| CN | 106648528 | A | 5/2017 |
| CN | 108319439 | A | 7/2018 |
| CN | 106528038 | B | 9/2019 |
| EP | 3282669 | B1 | 1/2020 |
| EP | 3627860 | A1 | 3/2020 |
| EP | 3684083 | A1 | 7/2020 |
| GB | 2351216 | B | 12/2002 |
| JP | H07288791 | A | 10/1995 |
| JP | 2003006132 | A | 1/2003 |
| JP | 4426484 | B2 | 3/2010 |
| KR | 20200028871 | A | 3/2020 |
| WO | WO 2008125593 | A2 | 10/2008 |
| WO | WO 2008141596 | A1 | 11/2008 |
| WO | WO 2010083119 | A2 | 7/2010 |
| WO | WO 2010143359 | A1 | 12/2010 |
| WO | WO 2018005235 | A1 | 1/2018 |
| WO | WO 2019008320 | A1 | 1/2019 |
| WO | WO 2019046597 | A1 | 3/2019 |
| WO | WO 2020041652 | A1 | 2/2020 |
| WO | 2022087147 | A1 | 4/2022 |

OTHER PUBLICATIONS

Purdy, "How the Metaverse Could Change Work," Apr. 5, 2022, https://hbr.org/2022/04/how-the-metaverse-could-change-work.*

Dipaola, S. and Collins, D., "A 3D Virtual Environment for Social Telepresence", Mar. 2002; 6 pages.

EngageVR, "Next Generation Education, Training, Meetings & Events," accessed at https://engagevr.io/, accessed on Oct. 28, 2020; 6 pages.

Event Farm, "Bring Your Events Into the Virtual World," accessed at https://eventfarm.com/the-echo, accessed on Oct. 28, 2020; 6 pages.

Hongtongsak, K., "Accurately Pinpointing 3D Sound in Virtual Environments," Jun. 2016, 31 pages.

Johansson, N., "The 10 Best VR Meeting Apps—Productive Remote Collaboration," accessed at https://immersive.ly/best-vr-apps-productive-remote-meetings/, accessed on Oct. 28, 2020; 10 pages.

Leung, W. and Chen, T., "Networked Collaborative Environment With Animated 3D Avatars, Dept. of Electrical and Computer Engineering Carnegie Mellon University," Aug. 6, 2002; 3 pages.

Leung, W. et al.., "Networked Intelligent Collaborative Environment (NetICE), Multimedia and Expo 2000," Aug. 6, 2002; 4 pages.

Leung, W. and Chen, T., "A Multi-User 3-D Virtual Environment With Interactive Collaboration and Shared Whiteboard Technologies, Kluwer Academic Publishers," Jul. 23, 2003, 17 pages.

Lin, J. et al., "A Virtual Reality Platform for Dynamic Human-Scene Interaction," Dec. 2016; 4 pages.

Nishihara, R. and Okubo, M., "A Study on Personal Space in Virtual Space Based on Personality," 2015; 8 pages.

Sandre, A., "Is Virtual Reality the Future of Video Conferencing?" May 15, 2020; 7 pages.

De Sousa, A., "Remote Proxemics for Collaborative Virtual Environments," Nov. 2014; 10 pages.

Takahashi, D., "MeetinVR launches online VR meetings with 'superpowers'," venturebeat.com, accessed at https://venturebeat.com/2020/05/27/meetinvr-launches-online-vr-meetings-with-superpowers, published May 27, 2020; 7 pages.

Teooh, "Virtual Spaces for Real Communities," accessed at https://teooh.com/, accessed on Oct. 28, 2020; 3 pages.

VirBELA Media, "Team Suites," accessed at https://www.virbela.com/teamsuites, accessed on Oct. 1, 2020; 26 pages.

Virtway Events, "Your 3D Space for Events," accessed at https://www.virtwayevents.com/, accessed on Oct. 28, 2020; 5 pages.

SaganWorks product website, "A personal metaverse of knowledge: Create stunning spaces to organize and store your information," available at https://saganworks.com, accessed Aug. 4, 2022; 4 pages.

Spatial, "Frequently Asked Questions," product website available at https://support.spatial.io/hc/en-us, accessed Aug. 4, 2022; 3 pages.

VSpatial product website, Virtual Reality Offices, "The workspace of the Future is Here." available at https://vspatial.com, accessed Aug. 4, 2022; 5 pages.

LearnOpenGL—CSM Online Resource, "Cascaded Shadow Mapping," available at https://learnopengl.com/Guest-Articles/2021/CSM, accessed Aug. 2, 2022; 10 pages.

(56) References Cited

OTHER PUBLICATIONS

Wikipedia, online resource, "Shadow mapping," available at https://en.wikipedia.org/wiki/Shadow_mapping, accessed Aug. 2, 2022; 6 pages.

Wikipedia, online resource, "Volumetric lighting," available at https://en.wikipedia.org/wiki/Volumetric_lighting, accessed Aug. 2, 2022; 2 pages.

Search Report and Written Opinion issued in PCT/US2023/070509, Nov. 3, 2023, 11 pages.

\* cited by examiner

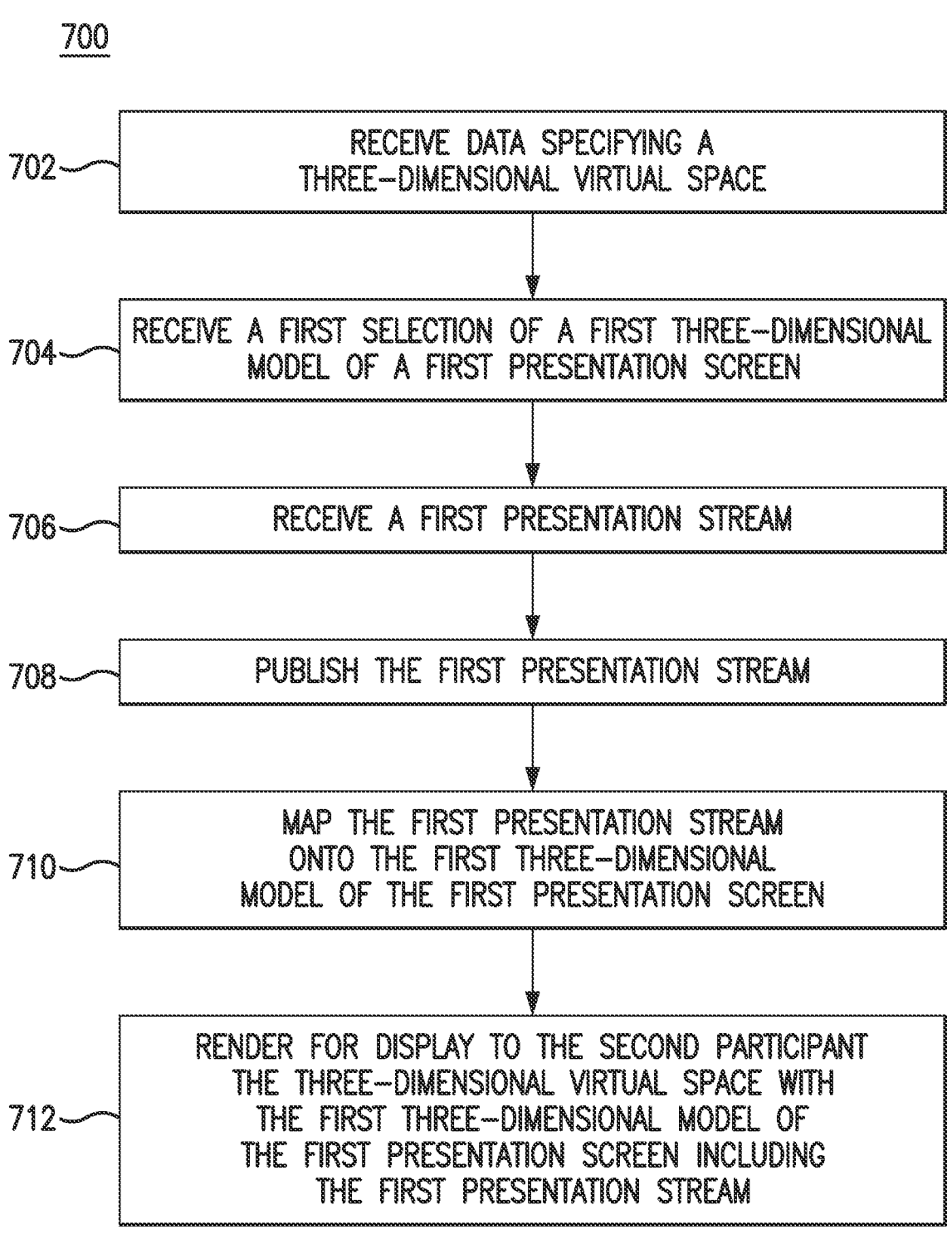

700

702 — RECEIVE DATA SPECIFYING A THREE-DIMENSIONAL VIRTUAL SPACE

704 — RECEIVE A FIRST SELECTION OF A FIRST THREE-DIMENSIONAL MODEL OF A FIRST PRESENTATION SCREEN

706 — RECEIVE A FIRST PRESENTATION STREAM

708 — PUBLISH THE FIRST PRESENTATION STREAM

710 — MAP THE FIRST PRESENTATION STREAM ONTO THE FIRST THREE-DIMENSIONAL MODEL OF THE FIRST PRESENTATION SCREEN

712 — RENDER FOR DISPLAY TO THE SECOND PARTICIPANT THE THREE-DIMENSIONAL VIRTUAL SPACE WITH THE FIRST THREE-DIMENSIONAL MODEL OF THE FIRST PRESENTATION SCREEN INCLUDING THE FIRST PRESENTATION STREAM

*FIG. 7*

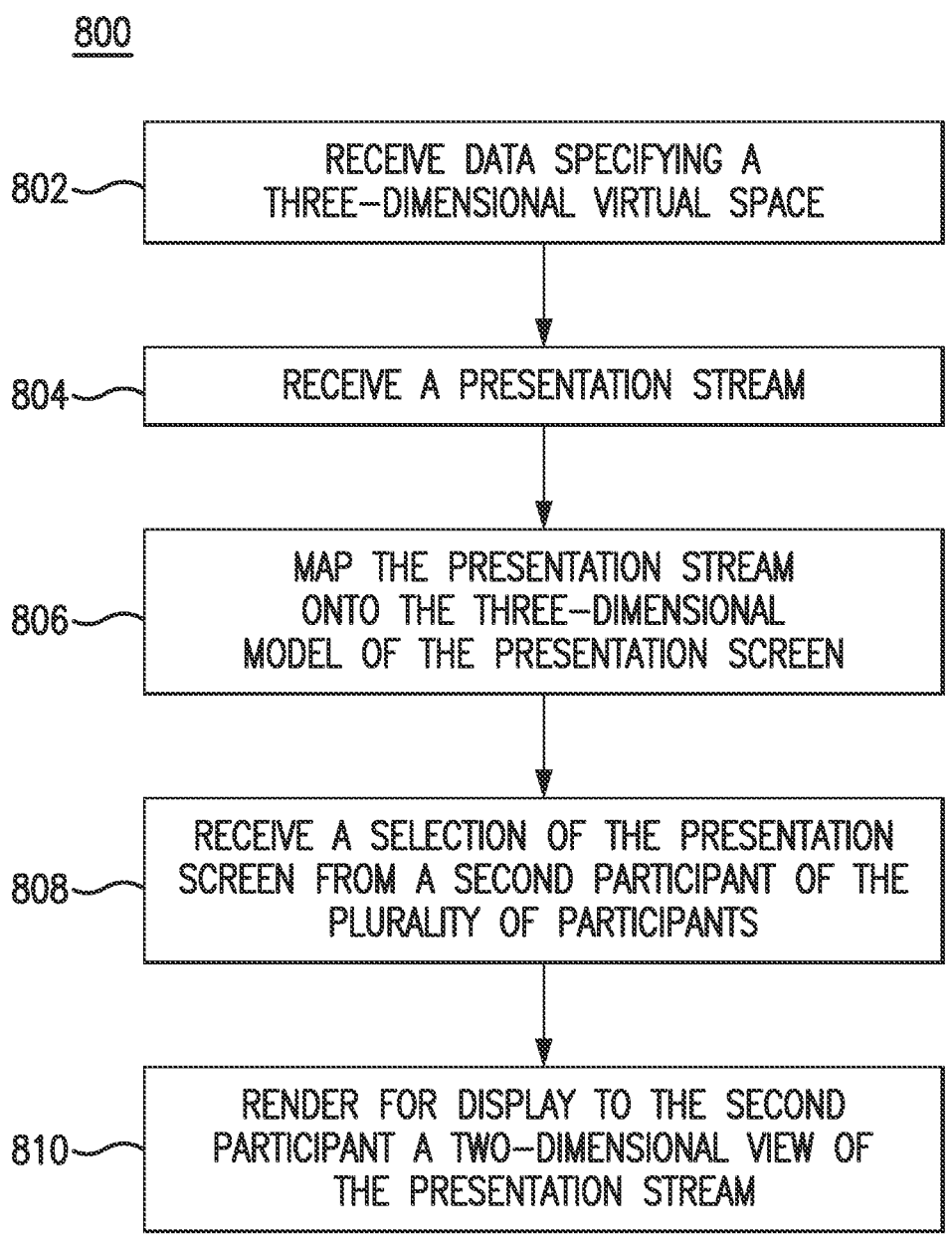

800

802 — RECEIVE DATA SPECIFYING A THREE-DIMENSIONAL VIRTUAL SPACE

804 — RECEIVE A PRESENTATION STREAM

806 — MAP THE PRESENTATION STREAM ONTO THE THREE-DIMENSIONAL MODEL OF THE PRESENTATION SCREEN

808 — RECEIVE A SELECTION OF THE PRESENTATION SCREEN FROM A SECOND PARTICIPANT OF THE PLURALITY OF PARTICIPANTS

810 — RENDER FOR DISPLAY TO THE SECOND PARTICIPANT A TWO-DIMENSIONAL VIEW OF THE PRESENTATION STREAM

FIG. 8

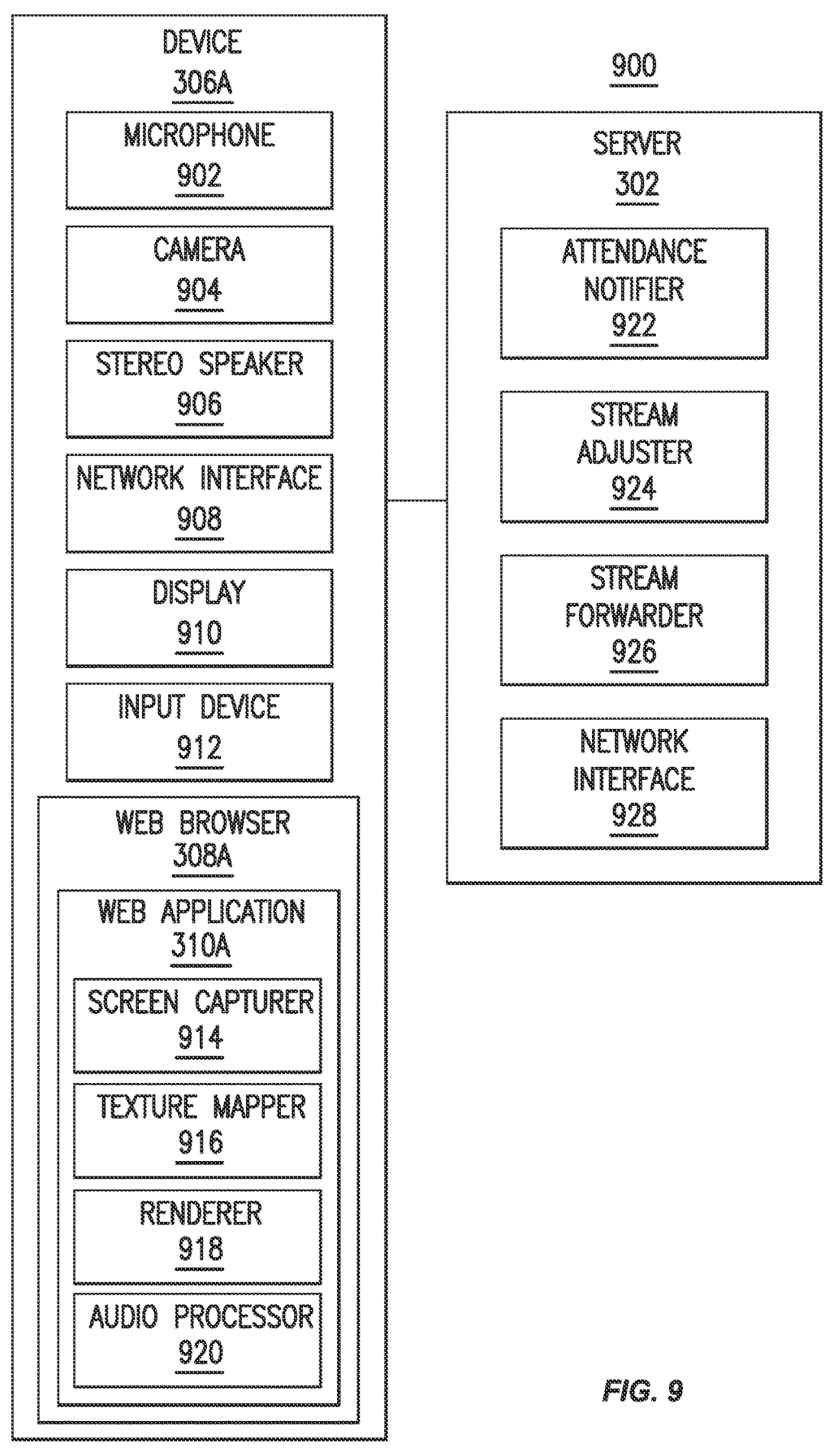

DEVICE
306A

MICROPHONE
902

CAMERA
904

STEREO SPEAKER
906

NETWORK INTERFACE
908

DISPLAY
910

INPUT DEVICE
912

WEB BROWSER
308A

WEB APPLICATION
310A

SCREEN CAPTURER
914

TEXTURE MAPPER
916

RENDERER
918

AUDIO PROCESSOR
920

900

SERVER
302

ATTENDANCE
NOTIFIER
922

STREAM
ADJUSTER
924

STREAM
FORWARDER
926

NETWORK
INTERFACE
928

FIG. 9

TWO-DIMENSIONAL VIEW OF A PRESENTATION IN A THREE-DIMENSIONAL VIDEOCONFERENCING ENVIRONMENT

BACKGROUND

Field

This field is generally related to videoconferencing.

Related Art

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, CA. Some videoconferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other user's devices.

Many of these videoconferencing applications have a screen share functionality. When a user decides to share their screen (or a portion of their screen), a stream is transmitted to the other users' devices with the contents of their screen. In some cases, other users can even control what is on the user's screen. In this way, users can collaborate on a project or make a presentation to the other meeting participants.

Recently, videoconferencing technology has gained importance. Especially since the COVID-19 pandemic, many workplaces, trade shows, meetings, conferences, schools, and places of worship are now taking place at least partially online. Virtual conferences using videoconferencing technology are increasingly replacing physical conferences. In addition, this technology provides advantages over physically meeting to avoid travel and commuting.

However, often, use of this videoconferencing technology causes loss of a sense of place. There is an experiential aspect to meeting in person physically, being in the same place, that is lost when conferences are conducted virtually. There is a social aspect to being able to posture yourself and look at your peers. This feeling of experience is important in creating relationships and social connections. Yet, this feeling is lacking when it comes to conventional videoconferences.

Moreover, when the conference starts to get several participants, additional problems occur with these videoconferencing technologies. In physical meeting conferences, people can have side conversations. You can project your voice so that only people close to you can hear what you're saying. In some cases, you can even have private conversations in the context of a larger meeting. However, with virtual conferences, when multiple people are speaking at the same time, the software mixes the two audio streams substantially equally, causing the participants to speak over one another. Thus, when multiple people are involved in a virtual conference, private conversations are impossible, and the dialogue tends to be more in the form of speeches from one to many. Here, too, virtual conferences lose an opportunity for participants to create social connections and to communicate and network more effectively.

Moreover, due to limitations in the network bandwidth and computing hardware, when a lot of streams are placed in the conference, the performance of many videoconferencing systems begins to slow down. Many computing devices, while equipped to handle a video stream from a few participants, are ill-equipped to handle a video stream from a dozen or more participants. With many schools operating entirely virtually, classes of 25 can severely slow down the school-issued computing devices.

Massively multiplayer online games (MMOG, or MMO) generally can handle quite a few more than 25 participants. These games often have hundreds or thousands of players on a single server. MMOs often allow players to navigate avatars around a virtual world. Sometimes these MMOs allow users to speak with one another or send messages to one another. Examples include the ROBLOX game available from Roblox Corporation of San Mateo, CA, and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable on videoconference. Some publications may describe having video placed on an avatar in a virtual world. However, these systems typically require specialized software and have other limitations that limit their usefulness.

Improved methods are needed for videoconferencing.

BRIEF SUMMARY

In an embodiment, a computer-implemented method allows sharing a presentation stream in a two-dimensional view. The method comprises receiving data specifying a three-dimensional virtual space. The three-dimensional virtual space comprises a plurality of participants and an avatar representing each of the plurality of participants. The method further comprises receiving a presentation stream from a first client device of a first participant of the plurality of participants and mapping the presentation stream onto a three-dimensional model of a presentation screen in the three-dimensional virtual space. The method further comprises receiving a selection of the presentation screen from a second participant of the plurality of participants and rendering for display to the second participant a two-dimensional view of the presentation stream.

System, device, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIG. 7 is a flowchart illustrating a method for sharing a presentation stream on a presentation screen in a virtual conference room, according to some embodiments.

FIG. 8 is a flowchart illustrating a method for rendering a 2-D view of a presentation stream, according to some embodiments.

FIG. 9 is a diagram illustrating components of devices used to provide videoconferencing within a virtual environment.

The drawing in which an element first appears is typically indicated by the leftmost digit or digits in the corresponding reference number. In the drawings, like reference numbers may indicate identical or functionally similar elements.

DETAILED DESCRIPTION

Video Conference with Avatars in a Virtual Environment

Figure 1:
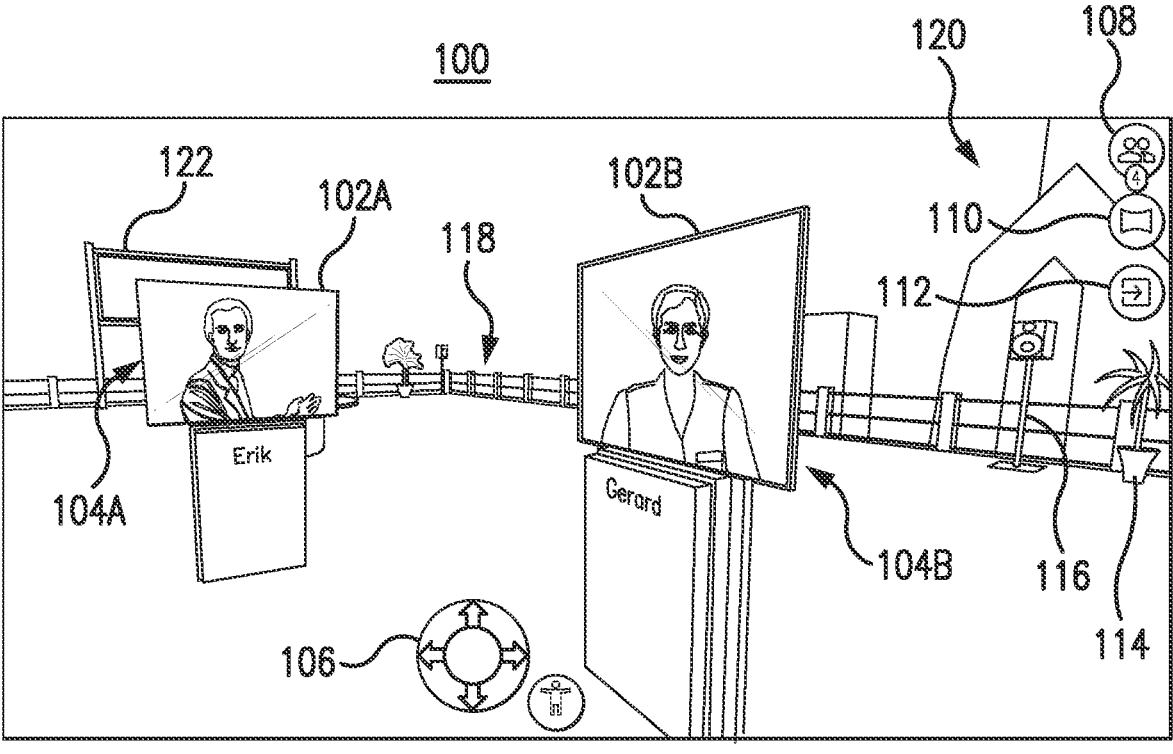
FIG. 1 is a diagram illustrating an example interface that provides videoconferencing in a virtual environment with video streams being mapped onto avatars.

FIG. 1 is a diagram illustrating an example of an interface 100 that provides videoconferences in a virtual environment with video streams being mapped onto avatars.

Interface 100 may be displayed to a participant to a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an embodiment, different inputs may change the virtual camera's X and Y position and pan and tilt angles in the virtual environment. In further embodiments, a user may use inputs to alter height (the Z coordinate) or yaw of the virtual camera. In still further embodiments, a user may enter inputs to cause the virtual camera to "hop" up while returning to its original position, simulating gravity. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying changes in pan and tilt angles.

Interface 100 includes avatars 102A and B, which each represent different participants to the videoconference. Avatars 102A and B, respectively, have texture mapped video streams 104A and B from devices of the first and second participant. A texture map is an image applied (mapped) to the surface of a shape or polygon. Here, the images are respective frames of the video. The camera devices capturing video streams 104A and B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and B are controlled by the respective participants that they represent. Avatars 102A and B are three-dimensional models represented by a mesh. Each avatar 102A and B may have the participant's name underneath the avatar.

The respective avatars 102A and B are controlled by the various users. They each may be positioned at a point corresponding to where their own virtual cameras are located within the virtual environment. Just as the user viewing interface 100 can move around the virtual camera, the various users can move around their respective avatars 102A and B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as three-dimensional model 118, these models can be represented using any mathematical way to represent a geometric surface in three-dimensional space. These models may be separate from three-dimensional model 118 or combined into a single representation of the virtual environment.

Decorative models, such as decorative model 114, serve to enhance the realism and increase the aesthetic appeal of the arena. Speaker model 116 may virtually emit sound, such as presentation and background music, as will be described in greater detail below with respect to FIGS. 5 and 7. Presentation screen model 122 can serve to provide an outlet to present a presentation. Video of the presenter or a presentation screen share may be texture mapped onto presentation screen model 122.

Button 108 may provide the user a list of participants. In one example, after a user selects button 108, the user could chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of its surroundings in the virtual environment.

Finally, button 112 causes the user to exit the virtual environment. Selecting button 112 may cause a notification to be sent to devices belonging to the other participants signaling to their devices to stop displaying the avatar corresponding to the user previously viewing interface 100.

In this way, interface virtual 3D space is used to conduct video conferencing. Every user controls an avatar, which they can control to move around, look around, jump or do other things which change the position or orientation. A virtual camera shows the user the virtual 3D environment and the other avatars. The avatars of the other users have as an integral part a virtual display, which shows the webcam image of the user.

By giving users a sense of space and allowing users to see each other's faces, embodiments provide a more social experience than conventional web conferencing or conventional MMO gaming. That more social experience has a variety of applications. For example, it can be used in online shopping. For example, interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching esports, watching performances captured using a three-dimensional camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/swordfighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective that a user wishes to experience the reactions), job interviews, game shows, interactive fiction (e.g., murder mystery), virtual fishing, virtual sailing, psychological research, behavioral analysis, virtual sports (e.g., climbing/bouldering), controlling the lights, etc., in your house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go as part of their work so they will actually meet each other organically (e.g., if you want to create an invoice, it is only possible from within the virtual location) and augmented reality where you project the face of the person on top of their AR headset (or helmet) so you can see their facial expressions (e.g., useful for military, law enforcement, firefighters, special ops), and making reservations (e.g., for a certain holiday home/car/etc.).

Figure 2:
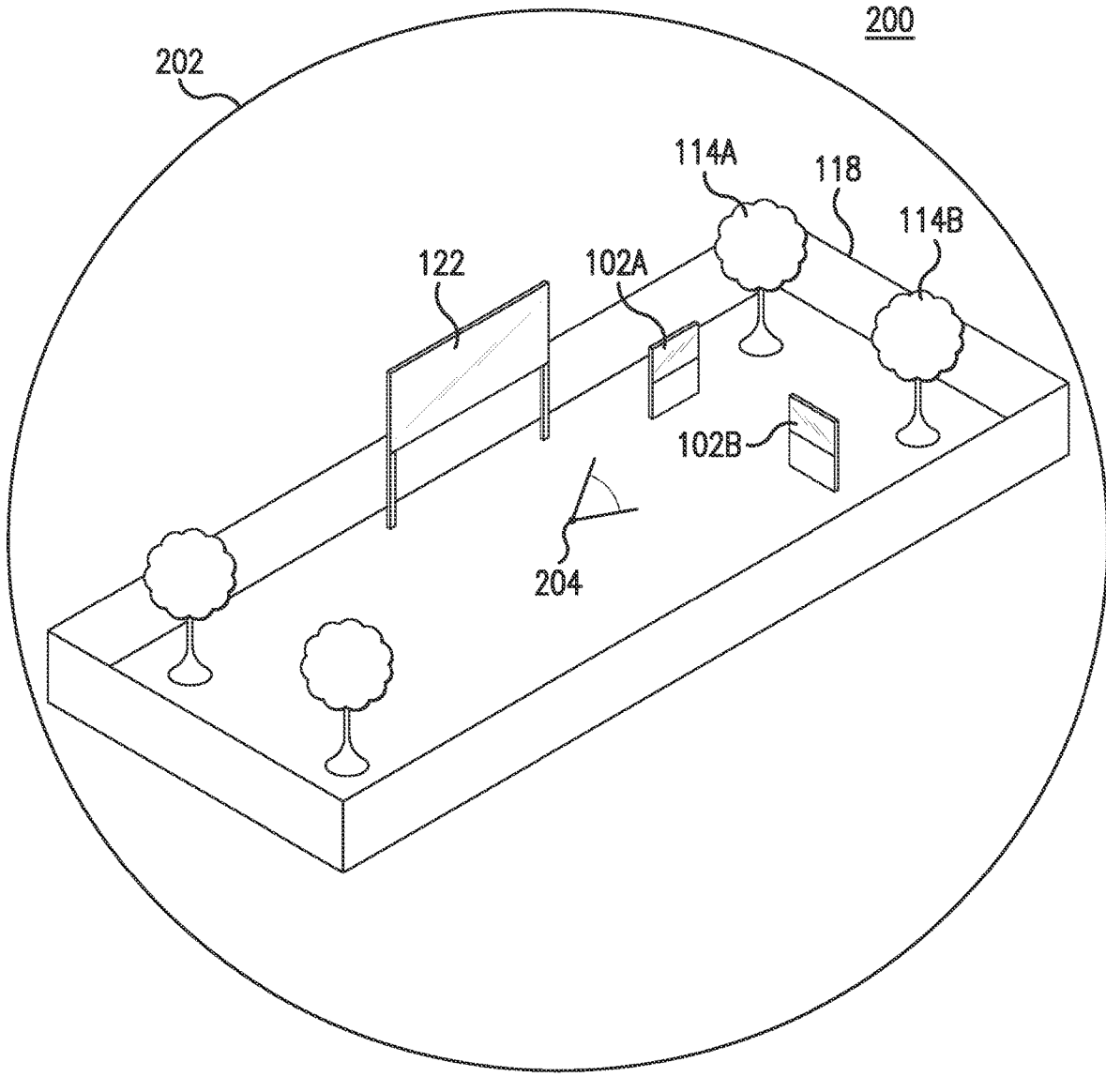
FIG. 2 is a diagram illustrating a three-dimensional model used to render a virtual environment with avatars for videoconferencing.

FIG. 2 is a diagram 200 illustrating a three-dimensional model used to render a virtual environment with avatars for videoconferencing. Just as illustrated in FIG. 1, the virtual environment here includes a three-dimensional arena 118, and various three-dimensional models, including three-dimensional models 114 and 122. Also as illustrated in FIG. 1, diagram 200 includes avatars 102A and B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within in the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other embodiments, other shapes instead of sphere 202 may be used to texture map the background image. In various alternative embodiments, the shape may be a cylinder, cube, rectangular prism, or any other three-dimensional geometry.

Figure 3:
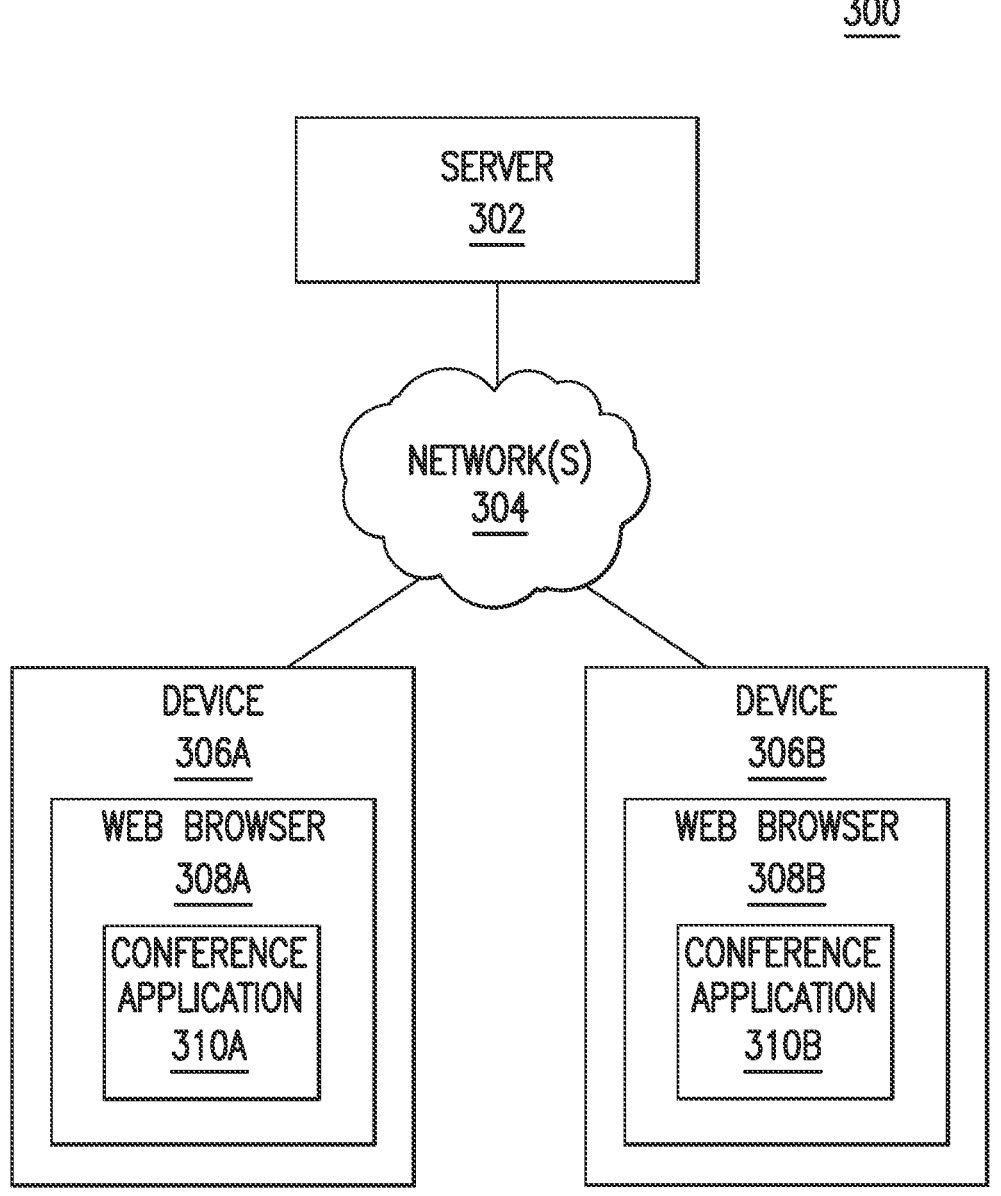
FIG. 3 is a diagram illustrating a system that provides videoconferences in a virtual environment.

FIG. 3 is a diagram illustrating a system 300 that provides videoconferences in a virtual environment. System 300 includes a server 302 coupled to devices 306A and B via one or more networks 304.

Server 302 provides the services to connect a videoconference session between devices 306A and 306B. As will be described in greater detail below, server 302 communicates notifications to devices of conference participants (e.g., devices 306A-B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A-B). Finally, server 302 stores and transmits data describing data specifying a three-dimensional virtual space to the respective devices 306A-B.

In addition to the data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative embodiment, communication between devices 306A-B happens not through server 302 but on a peer-to-peer basis. In that embodiment, one or more of the data describing the respective participants' location and direction, the notifications regarding new and exiting participants, and the video and audio streams of the respective participants are communicated not through server 302 but directly between devices 306A-B.

Network 304 enables communication between the various devices 306A-B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A-B are each devices of respective participants to the virtual conference. Devices 306A-B each receive data necessary to conduct the virtual conference and render the data necessary to provide the virtual conference. As will be described in greater detail below, devices 306A-B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A-B can be any type of computing device, including a laptop, a desktop, a smartphone, or a tablet computer, or wearable computer (such as a smartwatch or a augmented reality or virtual reality headset).

Web browser 308A-B can retrieve a network resource (such as a webpage) addressed by the link identifier (such as a uniform resource locator, or URL) and present the network resource for display. In particular, web browser 308A-B is a software application for accessing information on the World Wide Web. Usually, web browser 308A-B makes this request using the hypertext transfer protocol (HTTP or HTTPS). When a user requests a web page from a particular website, the web browser retrieves the necessary content from a web server, interprets and executes the content, and then displays the page on a display on device 306A-B shown as client/counterpart conference application 308A-B. In examples, the content may have HTML and client-side scripting, such as JavaScript. Once displayed, a user can input information and make selections on the page, which can cause web browser 308A-B to make further requests.

Conference application 310A-B may be a web application downloaded from server 302 and configured to be executed by the respective web browsers 308A-B. In an embodiment, conference application 310A-B may be a JavaScript application. In one example, conference application 310A-B may be written in a higher-level language, such as a Typescript language, and translated or compiled into JavaScript. Conference application 310A-B is configured to interact with the WebGL JavaScript application programming interface. It may have control code specified in JavaScript and shader code written in OpenGL ES Shading Language (GLSL ES). Using the WebGL API, conference application 310A-B may be able to utilize a graphics processing unit (not shown) of device 306A-B. Moreover, OpenGL rendering of interactive two-dimensional and three-dimensional graphics without the use of plug-ins.

Conference application 310A-B receives the data from server 302 describing position and direction of other avatars and three-dimensional modeling information describing the virtual environment. In addition, conference application 310A-B receives video and audio streams of other conference participants from server 302.

Conference application 310A-B renders three three-dimensional modeling data, including data describing the three-dimensional environment and data representing the respective participant avatars. This rendering may involve rasterization, texture mapping, ray tracing, shading, or other rendering techniques. In an embodiment, the rendering may involve ray tracing based on the characteristics of the virtual camera. Ray tracing involves generating an image by tracing a path of light as pixels in an image plane and simulating the effects of his encounters with virtual objects. In some embodiments, to enhance realism, the ray tracing may simulate optical effects such as reflection, refraction, scattering, and dispersion.

In this way, the user uses web browser 308A-B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Figure 4A:
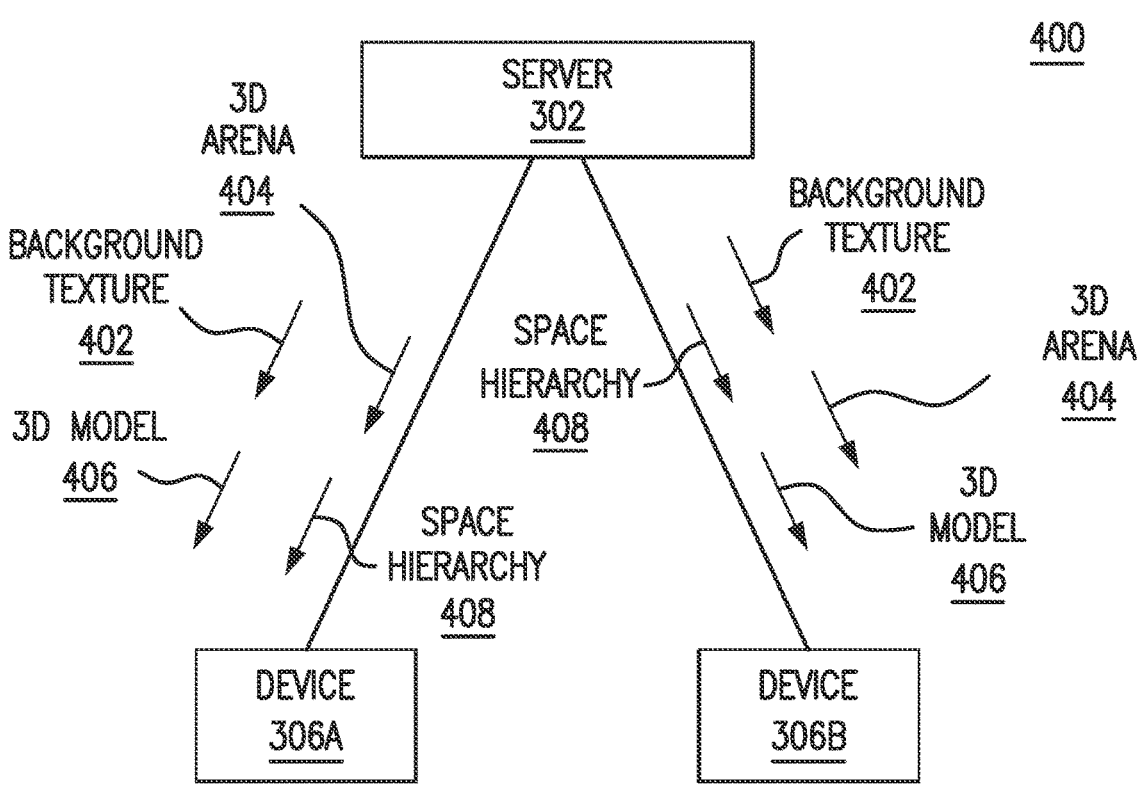
FIGS. 4A-C illustrate how data is transferred between various components of the system in FIG. 3 to provide videoconferencing.
Figure 4B:
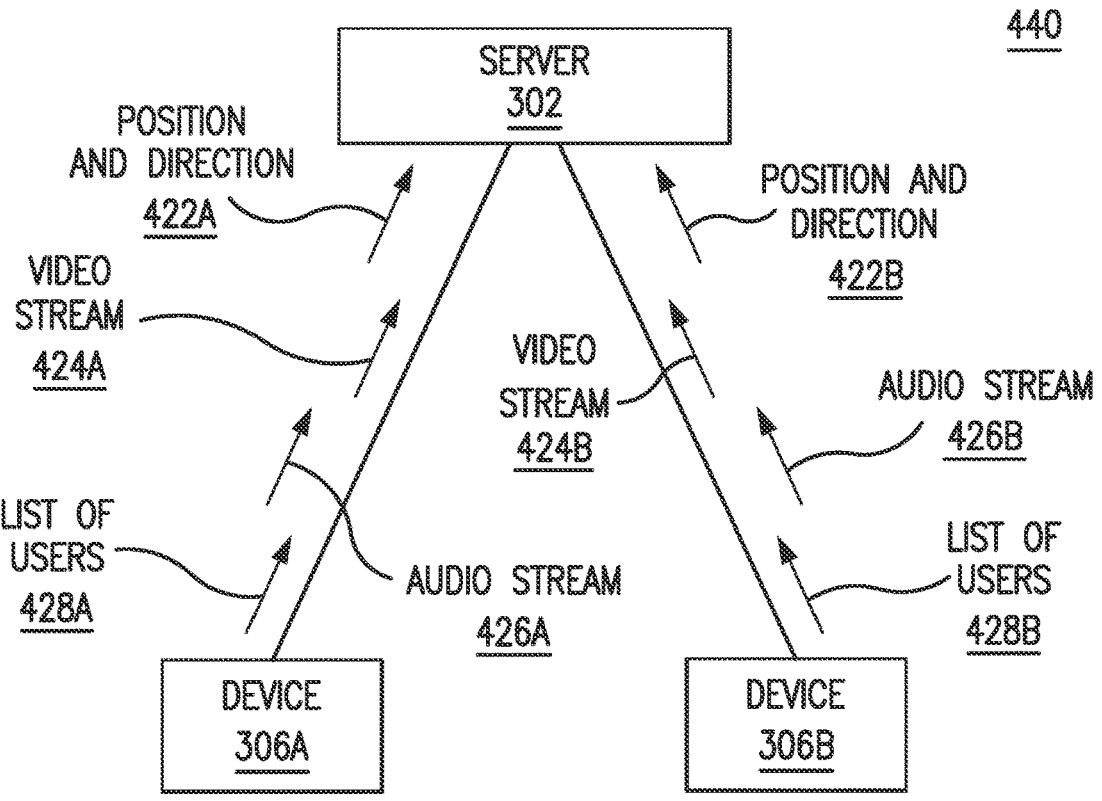
Figure 4C:
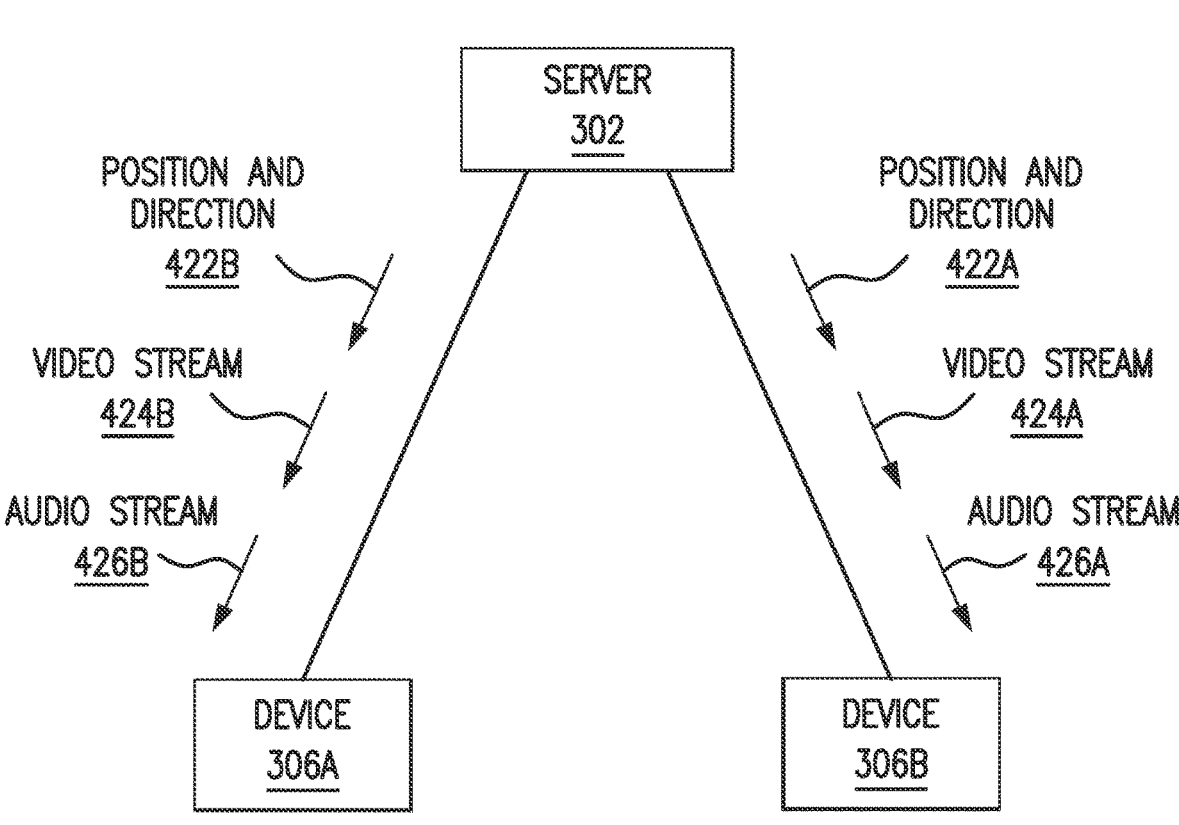

FIGS. 4A-C illustrate how data is transferred between various components of the system in FIG. 3 to provide videoconferencing. Like FIG. 3, each of FIGS. 4A-C depict the connection between server 302 and devices 306A and B. In particular, FIGS. 4A-C illustrate example data flows between those devices.

FIG. 4A illustrates a diagram 400 illustrating how server 302 transmits data describing the virtual environment to devices 306A and 306B. In particular, both devices 306A and 306B, receive from server 302 the three-dimensional arena 404, background texture 402, space hierarchy 408 and any other three-dimensional modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Three-dimensional model 406 is any other three-dimensional modeling information needed to conduct the conference. In one embodiment, this may include information describing the respective avatars. Alternatively or additionally, this information may include product demonstrations.

With the information needed to conduct the meeting sent to the participants, FIGS. 4B-C illustrate how server 302 forwards information from one device to another. FIG. 4B illustrates a diagram 420 showing how server 302 receives information from respective devices 306A and B, and FIG. 4C illustrates a diagram 420 showing how server 302 transmits the information to respective devices 306B and A. In particular, device 306A transmits position and direction 422A, video stream 424A, and audio stream 426A to server 302, which transmits position and direction 422A, video stream 424A, and audio stream 426A to device 306B. And device 306B transmits position and direction 422B, video stream 424B, and audio stream 426B to server 302, which transmits position and direction 422B, video stream 424B, and audio stream 426B to device 306A.

Position and direction 422A-B describe the position and direction of the virtual camera for the user using device 306A. As described above, the position may be a coordinate in three-dimensional space (e.g., x, y, z coordinate) and the direction may be a direction in three-dimensional space (e.g., pan, tilt, roll). In some embodiments, the user may be unable to control the virtual camera's roll, so the direction may only specify pan and tilt angles. Similarly, in some embodiments, the user may be unable to change the avatar's z coordinate (as the avatar is bounded by virtual gravity), so the z coordinate may be unnecessary. In this way, position and direction 422A-B each may include at least a coordinate on a horizontal plane in the three-dimensional virtual space and a pan and tilt value. Alternatively or additionally, the user may be able to "jump" its avatar, so the Z position may be specified only by an indication of whether the user is jumping their avatar.

In different examples, position and direction 422A-B may be transmitted and received using HTTP request responses or using socket messaging.

Video stream 424A-B is video data captured from a camera of the respective devices 306A and B. The video may be compressed. For example, the video may use any commonly known video codecs, including MPEG-4, VP8, or H.264. The video may be captured and transmitted in real time.

Similarly, audio stream 426A-B is audio data captured from a microphone of the respective devices. The audio may be compressed. For example, the video may use any commonly known audio codecs, including MPEG-4 or vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

The video stream 424A-B and audio stream 426A-B may be transmitted using the WebRTC application programming interface. The WebRTC is an API available in JavaScript. As described above, devices 306A and B download and run web applications, as conference applications 310A and B, and conference applications 310A and B may be implemented in JavaScript. Conference applications 310A and B may use WebRTC to receive and transmit video stream 424A-B and audio stream 426A-B by making API calls from its JavaScript.

As mentioned above, when a user leaves the virtual conference, this departure is communicated to all other users. For example, if device 306A exits the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference applications 310A and B may periodically or intermittently re-render the virtual space based on new information from respective video streams 424A and B, position and direction 422A and B, and new information relating to the three-dimensional environment. For simplicity, each of these updates are now described from the perspective of device 306A. However, a skilled artisan would understand device 306B would behave similarly given similar changes.

As device 306A receives video stream 424B, device 306A texture maps frames from video stream 424A on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some embodiments, server 302 may send updated model information describing the three-dimensional virtual environment. For example, server 302 may send updated information 402, 404, 406, or 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

While FIG. 3 in FIGS. 4A-C is illustrated with two devices for simplicity, a skilled artisan would understand that the techniques described herein can be extended to any number of devices. Also, while FIG. 3 in FIGS. 4A-C illustrates a single server 302, a skilled artisan would understand that the functionality of server 302 can be spread out among a plurality of computing devices. In an embodiment, the data transferred in FIG. 4A may come from one network address for server 302, while the data transferred in FIGS. 4B-C can be transferred to/from another network address for server 302.

In one embodiment, participants can set their webcam, microphone, speakers and graphical settings before entering the virtual conference. In an alternative embodiment, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Adjusting Volume for a Video Conference in a Virtual Environment

Embodiments also adjust volume to provide a sense of position and space within the virtual conference.

Figure 5A:
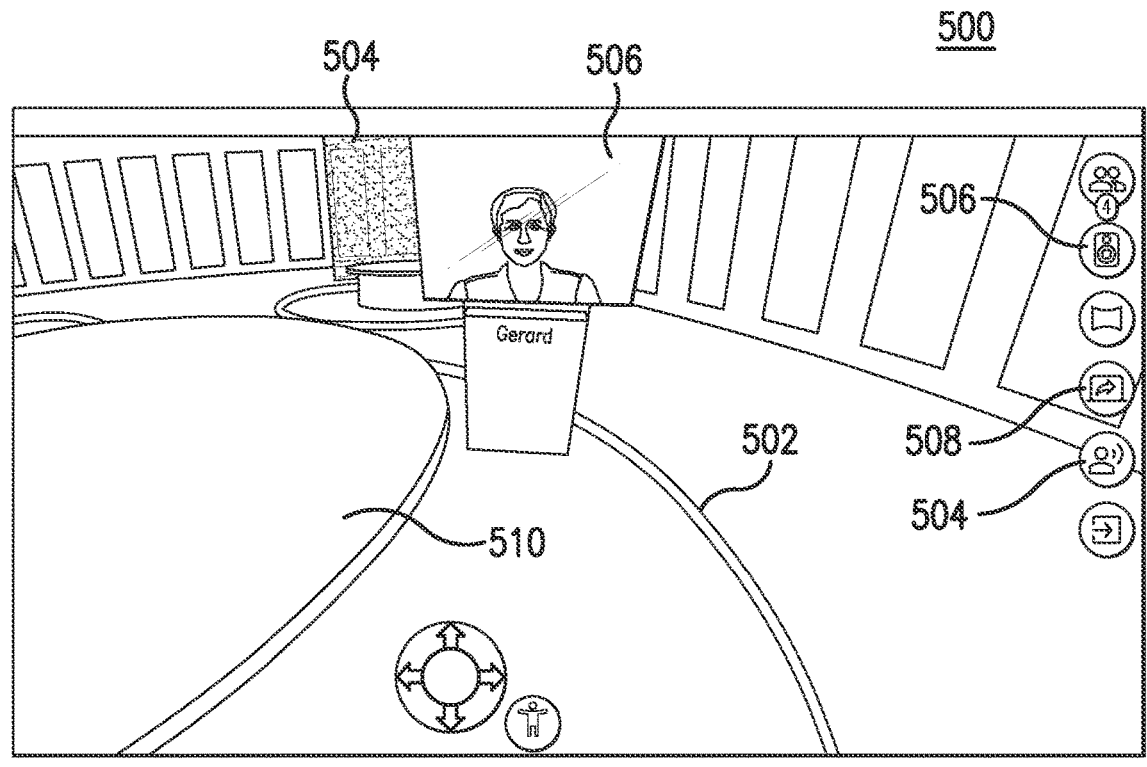
FIGS. 5A-B are diagrams illustrating different volume areas in a virtual environment during a videoconference.
Figure 5B:
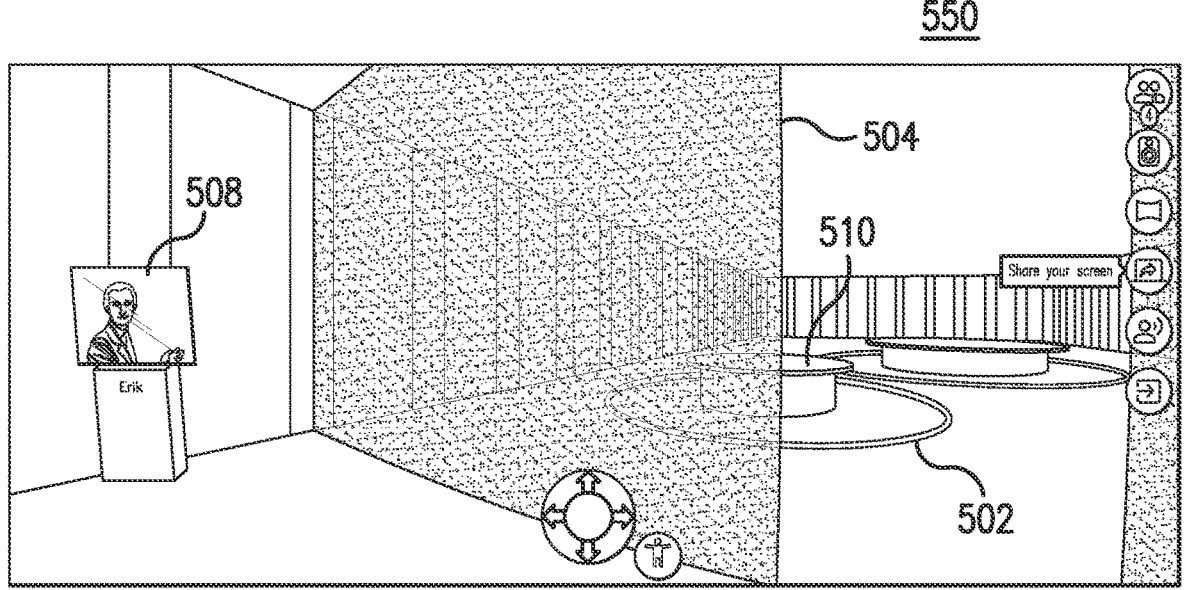

FIGS. 5A-B are diagrams illustrating different volume areas in a virtual environment during a videoconference.

The server may provide specification of sound or volume areas to the client devices. Virtual environment may be partitioned into different volume areas.

FIG. 5A illustrates a diagram 500 with a volume area 502 that allows for a semi-private or side conversation between a user controlling avatar 506 and the user controlling the virtual camera. In this way, the users around conference table 510 can have a conversation without disturbing others in the room. The sound from the users controlling avatar 506 in the virtual camera may fall off as it exits volume area 502, but not entirely. That allows passersby to join the conversation if they'd like.

Interface 500 also includes buttons 504, 506, and 508, which will be described below.

FIG. 5B illustrates a diagram 500 with a volume area 504 that allows for a private conversation between a user controlling avatar 508 and the user controlling the virtual camera. Once inside volume area 504, audio from the user controlling avatar 508 and the user controlling the virtual camera may only be output to those inside volume area 504. As no audio at all is played from those users to others in the conference, their audio streams may not even be transmitted to the other user devices.

Additionally or alternatively, the different areas have different roll off factors in that case, the distance based for individual areas based on the respective roll off factors. In this way, different areas of the virtual environment project sound at different rates. The audio gains may be applied to the audio stream to determine left and right audio accordingly. In this way, both wall transmission factors, roll off factors, and left-right adjustments to provide a sense of direction for the sound may be applied together to provide a comprehensive audio experience.

Different audio areas may have different functionality. For example, a volume area may be a podium area. If the user is located in the podium area, no attenuation may occur because of roll off factors or wall transmission factors. In some embodiments, the relative left-right audio may still be adjusted to provide a sense of direction.

For exemplary purposes, the same methods may be applied to other sound sources, other than avatars. For example, the virtual environment may have three-dimensional models of speakers. Sound may be emitted from the speakers in the same way as the avatar models described above, either because of a presentation or just to provide background music.

As mentioned above, wall transmission factors may be used to isolate audio entirely. In an embodiment, this can be used to create virtual offices. In one example, each user may have in their physical (perhaps home) office a monitor displaying the conference application constantly on and logged into the virtual office. There may be a feature that allows the user to indicate whether he's in the office or should not be disturbed. If the do-not-disturb indicator is off, a coworker or manager may come around within the virtual space and knock or walk in as they would in a physical office. The visitor may be able to leave a note if the worker is not present in her office. When the worker returns, she would be able to read the note left by the visitor. The virtual office may have a whiteboard and/or an interface that displays messages for the user. The messages may be email and/or from a messaging application such as the SLACK application available from Slack Technologies, Inc. of San Francisco, CA.

Users may be able to customize or personalize their virtual offices. For example, they may be able to put up models of posters or other wall ornaments. They may be able to change models or orientation of desks or decorative ornaments, such as plantings. They may be able to change lighting or view out the window.

Turning back to FIG. 5A, the interface 500 includes various buttons 504, 506, and 508. When a user presses the button 504, the attenuation may not occur, or may occur only in smaller amounts. In that situation, the user's voice is output uniformly to other users, allowing for the user to provide a talk to all participants in the meeting. The user video may also be output on a presentation screen within the virtual environment as well, as will be described below. When a user presses the button 506, a speaker mode is enabled. In that case, audio is output from sound sources within the virtual environment, such as to play background music. When a user presses button 508, a screen share mode may be enabled, enabling the user to share contents of a screen or window on their device with other users. The contents may be presented on a presentation model. This too will be described below.

Presenting in a Three-dimensional Environment

Embodiments also allow users in the three-dimensional virtual environment to share a presentation stream on a presentation screen in the three-dimensional virtual environment used for video conferencing.

FIGS. 6A-E illustrate an interface 600 with presentation screens in a three-dimensional virtual environment used for videoconferencing. As described above with respect to FIG. 1, interface 600 may be displayed to a user who can navigate around the virtual environment. As illustrated in interface 600, the virtual environment includes a virtual conference room with multiple presentation screens.

Figure 6A:
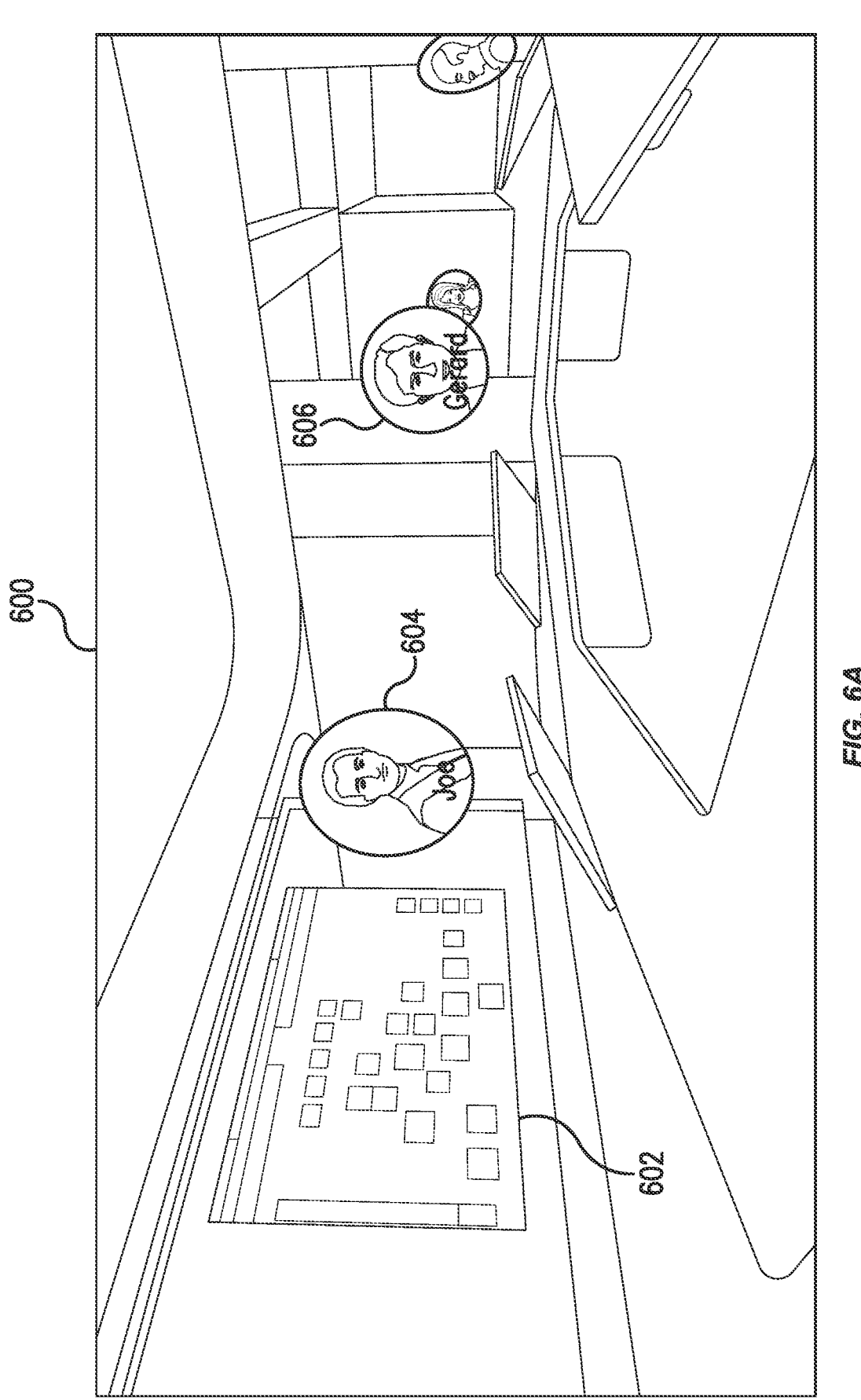
FIGS. 6A-E illustrate an interface with example presentation screens in a three-dimensional virtual environment used for videoconferencing.

FIG. 6A illustrates interface 600 with a three-dimensional model of presentation screen 602. In this embodiment, interface 600 may include a virtual conference room. Users represented by avatars 604-606 may conduct a meeting in the virtual conference room. The users may be participants of the meeting. The virtual conference room may include the three-dimensional model of presentation screen 602. Presentation screen 602 may be positioned at a central location of the virtual conference room. The virtual conference room may include a virtual conference table with additional three-dimensional models of presentation screens distributed around the virtual conference table. The virtual conference table with the additional three-dimensional models of presentation screens will be described in further detail with respect to FIGS. 6B-6C.

Presentation screen 602 may be a main presentation screen. In this regard, presentation screen 602 may be larger than the additional presentation screens distributed around the virtual conference table. Furthermore, presentation screen 602 may be positioned such that it is visible to all of the participants in the virtual conference room.

A first participant in the virtual conference room may want to share a presentation stream captured by their device (e.g., device 306A or device 306B) on the three-dimensional model of presentation screen 602. The server (e.g., server 302) may receive a selection of presentation screen 602. In some embodiments, the first participant may select a share screen button located on the three-dimensional model of presentation screen 602. The share screen button may cause a prompt to be rendered on the first participant's device asking prompt the user to select a screen and/or window of their device to share on presentation screen 602. In other embodiments, the first participant may select a share screen button on interface 600. Selecting the share screen button on interface 600 may cause a prompt to be rendered on the first participant's device asking the first participant to select a screen and/or window of their device to share on the three-dimensional model of presentation screen 602. Furthermore, selecting the share screen button on interface 600 may cause a prompt to be rendered on the first participant's device asking the user to select a presentation screen in the virtual conference room.

In response to receiving a selection of the three-dimensional model of presentation screen 602, the server may receive a presentation stream from the first participant's device. Specifically, the selection of presentation screen 602 and presentation stream may be published to the server. The presentation stream may include audio and video data. In one embodiment, the presentation stream may be a video stream from a camera on first participant's device. In another embodiment, the presentation stream may be a screen share from the user's device, where a monitor or window is shared. Through screen share or otherwise, the presentation video and audio stream could also be from an external source, for example a livestream of an event. When the first participant enables presenter mode, the presentation stream (and audio stream) of the first participant is published to the server tagged with the name of the screen the user wants to use. Other clients are notified that a new stream is available.

The presentation stream is texture mapped onto the three-dimensional model of a presentation screen 602. A presentation screen may take a variety of forms, such as a poster, a view out of a window, a view of a control panel, or a surface of a table with object placed on it. The participants in the virtual conference room can consume the presentation stream by viewing presentation screen 602. In other words, from the perspective of a virtual camera the participants in the virtual conference room, the presentation stream may be rendered for display to the users in the virtual conference room on presentation screen 602.

An audio stream is captured synchronously with the presentation stream and from a microphone of the device of the first participant. The audio stream from the microphone of the first participant may be heard by other participants as to be coming from presentation screen 602. In this way, presentation screen 602 may be a sound source as described above. Because the first participant's audio stream is projected from the presentation screen 602, it may be suppressed coming from the first participant's avatar. In this way, the audio stream is outputted to play synchronously with display of the presentation stream on screen 602 within the three-dimensional virtual space.

In some embodiments, the first participant may also be able to control the location and orientation of the audience members. For example, the first participant may have an option to select to re-arrange all the other participants to the meeting to be positioned and oriented to face the presentation screen.

Figure 6B:
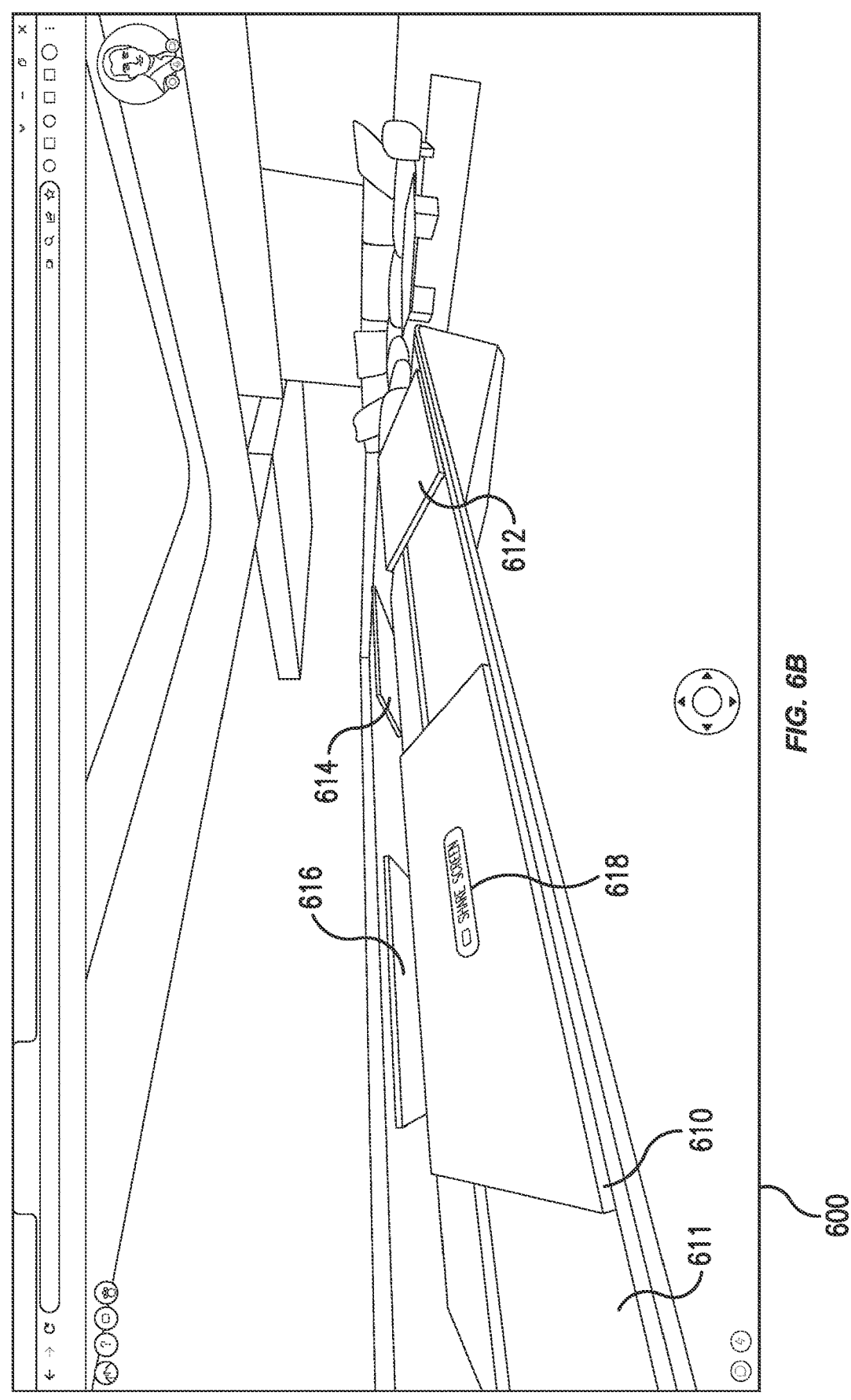

FIG. 6B illustrates interface 600 multiple presentation screens around a virtual conference table. As described above, the virtual conference room may include a three-dimensional model of a virtual conference table 611. In this embodiment, three-dimensional models of presentation screens 610-616 may be positioned around the virtual conference table 611. Each of the presentation screens 610-616 may include a 'share screen' button. For example, presentation screen 610 may include 'share screen' button 618. Similarly, presentation screens may also include the 'share screen' button.

As a non-limiting example, the first participant may select 'share screen' button 618 located on the three-dimensional model of presentation screen 610 to share a presentation stream from their device (e.g., device 306A or 306B). The share screen button may cause a prompt to be rendered on the first participant's device asking the first participant to select a screen and/or window of their device to share on presentation screen 610. In other embodiments, the first participant may select a share screen button on interface 600. Selecting the share screen button on interface 600 may cause a prompt to be rendered on the first participant's device asking the user to select a screen and/or window of their device to share on presentation screen 610. Furthermore, selecting the share screen button on interface 600 may cause a prompt to be rendered on the first participant's device asking the first participant to select one of presentation screens 610-616. The first participant may also select presentation screen 602, as shown in FIG. 6A. In other embodiments, the server may automatically select one of presentation screens 610-616 (or 602) based on the availability of presentation screen, the size of the presentation screen, or the proximity of the first participant's avatar to a given presentation screen in the three-dimensional virtual environment.

In response to receiving a selection of the three-dimensional model of presentation screen 610, the server may receive a presentation stream from the first participant's device. Specifically, the selection of the three-dimensional model of presentation screen 610 and presentation stream may be published to the server. Other clients are notified that a new stream is available.

Figure 6C:
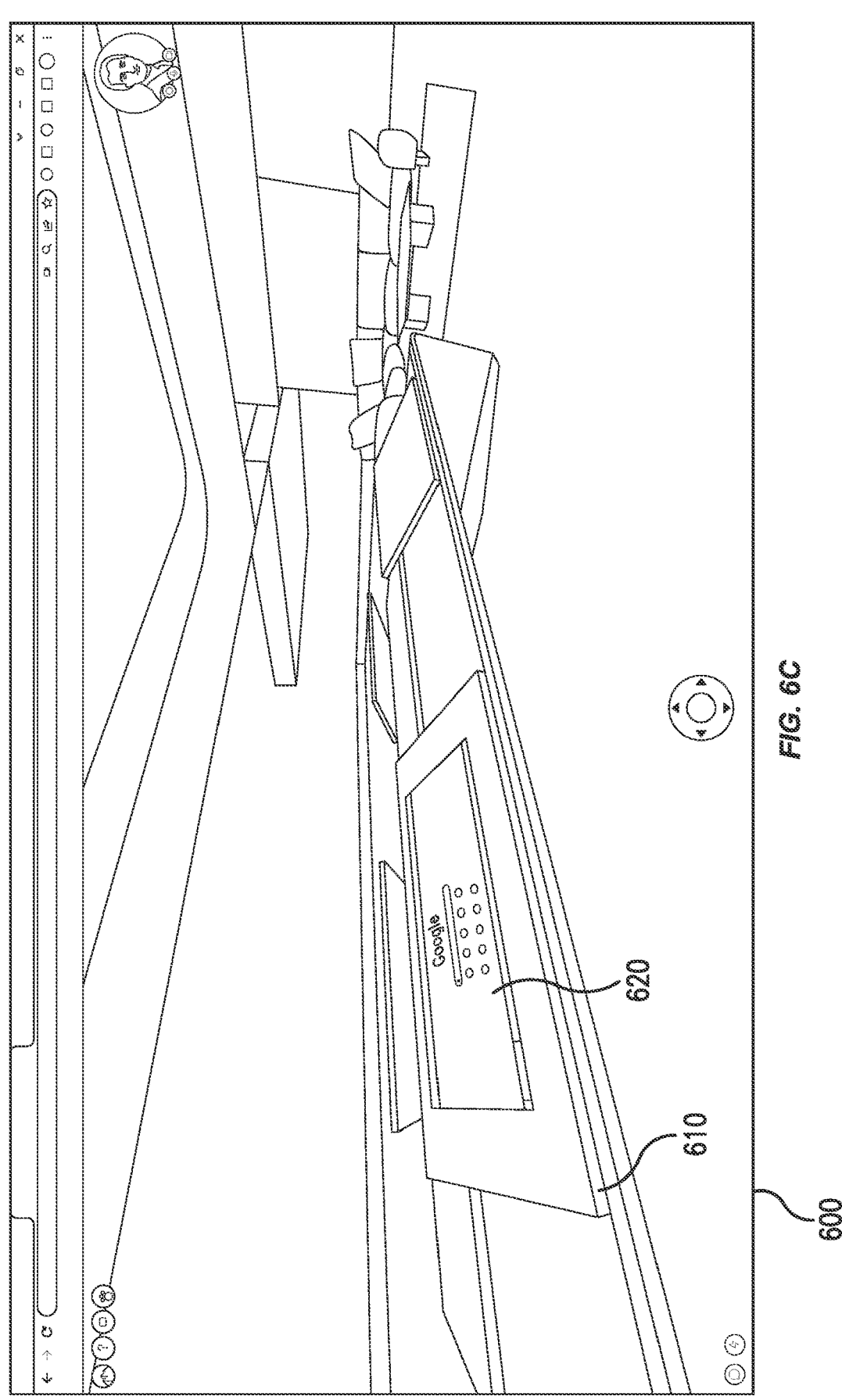

FIG. 6C illustrates the first participant's presentation stream being shared on presentation screen 610. The first participant's presentation stream 620 is texture mapped onto the three-dimensional model of presentation screen 610. The participants in the virtual conference room can consume presentation stream 620 by viewing presentation screen 610. In other words, from the perspective of a virtual camera the participants in the virtual conference room, presentation stream 620 may be rendered for display to the participants in the virtual conference room on the three-dimensional model of a presentation screen 610. As such, the participants will have to navigate their respective avatars with respect to presentation screen 610 in the virtual conference room to consume presentation stream 620.

An audio stream is captured synchronously with presentation stream 620 and from a microphone of the device of the first participant. The audio stream from the microphone of the user may be heard by other users as to be coming from presentation screen 610. In this way, presentation screen 610 may be a sound source as described above. Because the first participant's audio stream is projected from the presentation screen 610, it may be suppressed coming from the user's avatar. In this way, the audio stream is outputted to play synchronously with display of presentation stream 620 on presentation screen 610 within the three-dimensional virtual space.

The first participant or other participants in the virtual conference room may share other presentation streams on remaining available presentation screens (e.g., presentation screens 612-616 or 602). As such, a single participant may concurrently share a plurality of streams, or multiple participants may each share concurrently a presentation stream in the virtual conference room. When multiple presentation streams are shared, audio from the various presentation streams are combined (along with audio from other sources, such as from other user's avatars), as described above with respect FIG. 5A-B. The audio is positional, including optional falloff. Alternatively or additionally, a user, such as a presenter, participant, or administrator, may have more control over the audio. For example, a user interface element may enable the user to mute all participants or all presentation streams except a specific one.

The first participant can chose to stop sharing the presentation stream by selecting a button on interface 600. In response to the first participant selecting the button, the server can end the presentation stream being rendered on a presentation stream. In some embodiments, the server may end the presentation stream being rendered on a presentation stream based on the first participant leaving the three-dimensional virtual environment or the first participant's avatar being more than a predetermined threshold distance from the presentation screen. For example, if the first participant leave the virtual conference room, the server may end the presentation stream being rendered on a presentation stream.

As described above with respect to FIGS. 5 and 6, the virtual conference room may be a volume area. As such, users outside the virtual conference room may not be able to consume the presentation streams being shared by the participants in the virtual conference room.

In some embodiments, in response to the presentation stream being published to the server, the server may determine which participants in the virtual conference room may consume the presentation stream. For example, determine which participants in the virtual conference room may consume the presentation stream based on position/title, security clearance, position of the participant's avatar in the virtual conference room/three-dimensional virtual environment, etc. In some embodiments, a participant (e.g., first participant) may select which participants are to consume the presentation stream. The selection of the participants may be transmitted along with the presentation stream to the server.

Figure 6D:
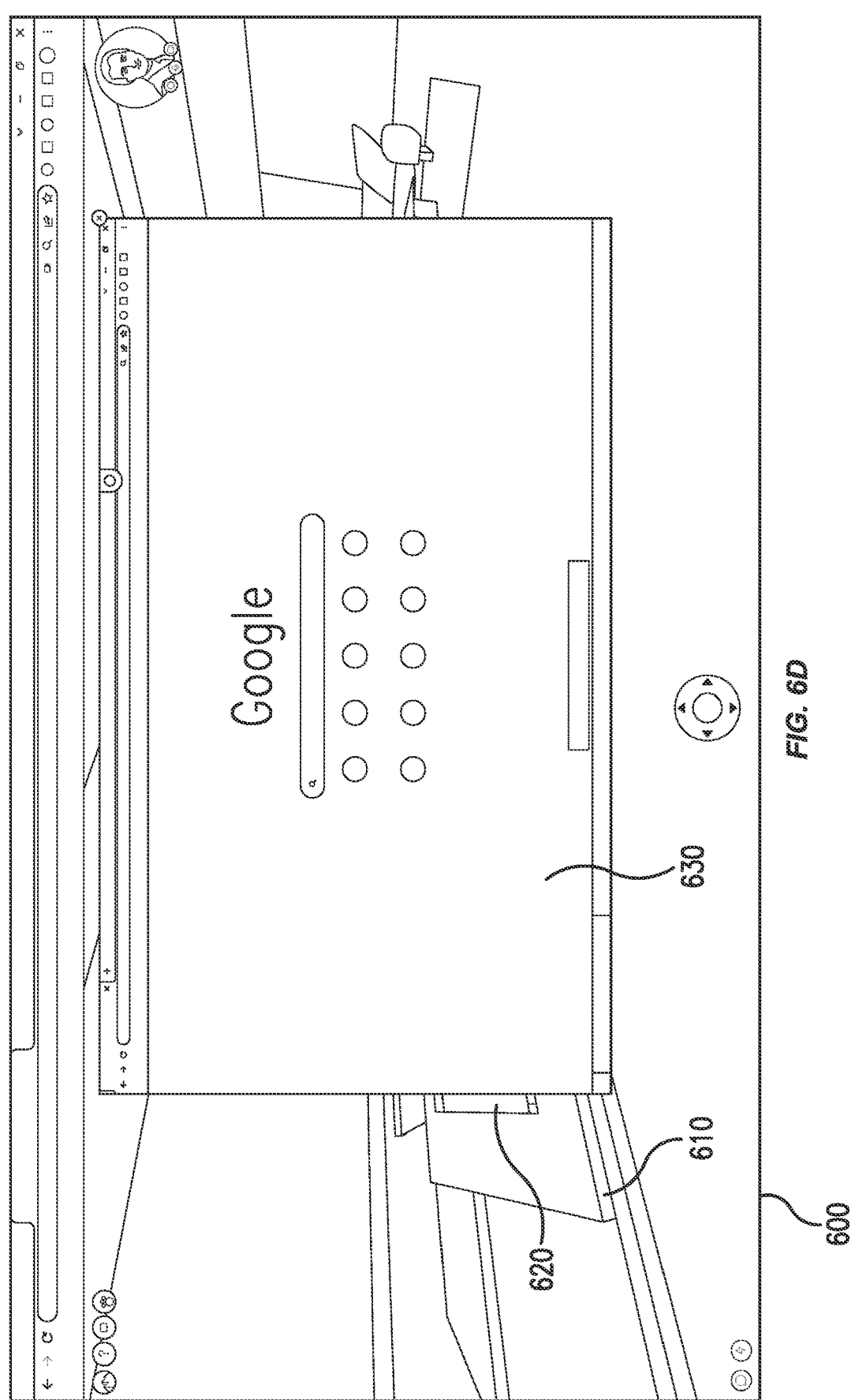

FIG. 6D illustrates a 2-D view of the presentation stream. A participant in the virtual conference room may want to view presentation stream 620 being rendered on a presentation screen in a 2-D view. The participant may select the presentation stream 620 (e.g., by clicking on the presentation stream). In response to selecting presentation stream 620, the server or the participant's device may cause a 2-D view 630 of presentation stream 620 to be rendered on the participant's device.

2-D view 630 of presentation stream 620 may be rendered over the three-dimensional virtual environment on the participant's device. As such, the three-dimensional virtual environment may be visible to the participant around 2-D view 630. Presentation stream 620 may continue to be rendered on presentation screen 610 while 2-D view 630 of presentation stream 620 is rendered on the participant's device.

Figure 6E:
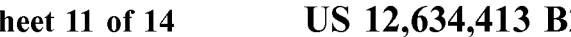

FIG. 6E illustrates a 2-D view of a participant's view of the three-dimensional virtual space. In some embodiments, a participant may share presentation stream 650 in on presentation screen 660 in the virtual conference room. Presentation stream 650 may include the participant's view of the three-dimensional virtual environment. As such, presentation stream 650 may include the avatars and virtual conference room from the participant's perspective.

In response to selecting to share presentation stream 650, presentation stream 650 may mapped to presentation screen 660. Presentation stream 650 may be rendered in 2-D on presentation screen 660. Presentation stream 650 is continuously updated as the perspective of the participant is updated in the virtual conference room. Presentation stream 650 may provide a honeycomb view of the virtual conference room. The participants in the virtual conference room may consume presentation stream 650.

FIG. 7 is a flow chart illustrating a method 700 for sharing a presentation stream on a presentation screen in a virtual conference room, according to some embodiments.

In 702, data specifying a three-dimensional virtual space is received. As described above with respect to FIG. 1, a three-dimensional virtual environment is rendered for users. The users may navigate around the three-dimensional virtual environment using avatars. The three-dimensional virtual environment may include virtual conference rooms. The users may also attend a meeting in a virtual conference room. The users may be participants of the meeting.

In 704, a selection of a first three-dimensional model of a first presentation screen is received from a first participant. The virtual conference room may include multiple three-dimensional models of presentation screens. The presentation screens may be of varying sizes. A first participant may select the first presentation screen by clicking a 'share screen' button on the first three-dimensional model of a first presentation screen. Alternatively, the first participant may select the first presentation screen by selecting from a list of available presentation screens in the virtual conference room. In another example, first participant's device or server may automatically select the first presentation screen for the first participant based on the availability of the first presentation screen, the attributes of the presentation screen (e.g., size, location, etc.), or the proximity of the first participant's avatar to the presentation screen. The first presentation screen may be selected to share a presentation stream.

In 706, the presentation stream is received. The presentation stream is audio and video data. In one example, the presentation stream may be sharing a screen or window rendered on the first participant's device. The presentation stream is published to the server (e.g., server 302). The server informs the other devices of other participants in the virtual conference room of the presentation stream. In some embodiments, the server informs the participants permitted to consume the presentation stream.

In 708, the presentation stream is mapped to the first three-dimensional model of the first presentation screen. The presentation stream may be textured mapped to the first three-dimensional model of the first presentation screen.

In 710, the first three-dimensional model of the first presentation screen including the first presentation stream is rendered for display for the other participants. The other participants in the virtual conference room may consume the presentation stream.

FIG. 8 is a flow chart illustrating a method 800 for rendering a 2-D view of a presentation stream, according to some embodiments.

In 802, data specifying a three-dimensional virtual space is received. As described above with respect to FIG. 1, a three-dimensional virtual environment is rendered for users. The users may navigate around the three-dimensional virtual environment using avatars. The three-dimensional virtual environment may include virtual conference rooms. The users may also attend a meeting in a virtual conference room. The users may be participants of the meeting.

In 804, the presentation stream is received from a first participant. In one example, the presentation stream may be sharing a screen or window rendered on the first participant's device.

In 806, the presentation stream is mapped to a three-dimensional model of a presentation screen in the virtual conference room. The presentation stream may be textured mapped to the three-dimensional model of the presentation screen.

In 808, a selection of the presentation screen is received from a second participant. The second participant may select to view a 2-D view of the presentation stream by selecting (e.g., clicking on) the presentation screen.

In 810, rendering for display for the second participant a 2-D view of the presentation stream. A 2-D window including the presentation stream may be rendered on the second participant's device. The 2-D window may be overlaid on the three-dimensional virtual environment. The presentation stream may continue to be rendered on the presentation screen while the 2-D view of the presentation stream is rendered for on the second participant's device.

FIG. 9 is a diagram of a system 900 illustrating components of devices used to provide videoconferencing within a virtual environment. In various embodiments, system 900 can operate according to the methods described above.

Device 306A is a user computing device. Device 306A could be a desktop or laptop computer, smartphone, tablet, or wearable (e.g., watch or head mounted device). Device 306A includes a microphone 902, camera 904, stereo speaker 906, input device 912. Not shown, device 306A also includes a processor and persistent, non-transitory and volatile memory. The processors can include one or more central processing units, graphic processing units or any combination thereof.

Microphone 902 converts sound into an electrical signal. Microphone 902 is positioned to capture speech of a user of device 306A. In different examples, microphone 1502 could be a condenser microphone, electret microphone, moving-coil microphone, ribbon microphone, carbon microphone, piezo microphone, fiber-optic microphone, laser microphone, water microphone, or MEMs microphone.

Camera 904 captures image data by capturing light, generally through one or more lenses. Camera 904 is positioned to capture photographic images of a user of device 306A. Camera 904 includes an image sensor (not shown). The image sensor may, for example, be a charge coupled device (CCD) sensor or a complementary metal oxide semiconductor (CMOS) sensor. The image sensor may include one or more photodetectors that detect light and convert to electrical signals. These electrical signals captured together in a similar timeframe comprise a still photographic image. A sequence of still photographic images captured at regular intervals together comprise a video. In this way, camera 904 captures images and videos.

Stereo speaker 906 is a device which converts an electrical audio signal into a corresponding left-right sound. Stereo speaker 906 outputs the left audio stream and the right audio stream generated by an audio processor 920 (below) to be played to device 306A's user in stereo. Stereo speaker 906 includes both ambient speakers and headphones that are designed to play sound directly into a user's left and right ears. Example speakers includes moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 908 is a software or hardware interface between two pieces of equipment or protocol layers in a computer network. Network interface 908 receives a video stream from server 302 for respective participants for the meeting. The video stream is captured from a camera on a device of another participant to the video conference. Network interface 908 also received data specifying a three-dimensional virtual space and any models therein from server 302. For each of the other participants, network interface 908 receives a position and direction in the three-dimensional virtual space. The position and direction are input by each of the respective other participants.

Network interface 908 also transmits data to server 302. It transmits the position of device 306A's user's virtual camera used by renderer 918 and it transmits video and audio streams from camera 904 and microphone 902.

Display 910 is an output device for presentation of electronic information in visual or tactile form (the latter used for example in tactile electronic displays for blind people). Display 910 could be a television set, computer monitor, head-mounted display, heads-up displays, output of a augmented reality or virtual reality headset, broadcast reference monitor, medical monitors mobile displays (for mobile devices), smartphone displays (for smartphones). To present the information, display 910 may include an electroluminescent (ELD) display, liquid crystal display (LCD), light-emitting diode (LED) backlit LCD, thin-film transistor (TFT) LCD, light-emitting diode (LED) display, OLED display, AMOLED display, plasma (PDP) display, or quantum dot (QLED) display.

Input device 912 is a piece of equipment used to provide data and control signals to an information processing system such as a computer or information appliance. Input device 912 allows a user to input a new desired position of a virtual camera used by renderer 918, thereby enabling navigation in the three-dimensional environment. Examples of input devices include keyboards, mouse, scanners, joysticks, and touchscreens.

Web browser 308A and web application 310A were described above with respect to FIG. 3. Web application 310A includes screen capturer 914, texture mapper 1516, renderer 918, and audio processor 920.

Screen capturer 914 captures a presentation stream, in particular a screen share. Screen capturer 914 may interact with an API made available by web browser 308A. By calling a function available from the API, screen capturer 914 may cause web browser 308A to ask the user which window or screen the user would like to share. Based on the answer to that query, web browser 308A may return a video stream corresponding to the screen share to screen capturer 914, which passes it on to network interface 908 for transmission to server 302 and ultimately to other participants' devices.

Texture mapper 916 textures map the video stream onto a three-dimensional model corresponding to an avatar. Texture mapper 916 May texture map respective frames from the video to the avatar. In addition, texture mapper 916 may texture map a presentation stream to a three-dimensional model of a presentation screen.

Renderer 918 renders, from a perspective of a virtual camera of the user of device 306A, for output to display 910 the three-dimensional virtual space including the texture-mapped three-dimensional models of the avatars for respective participants located at the received, corresponding position and oriented at the direction. Renderer 918 also renders any other three-dimensional models including for example the presentation screen.

Audio processor 920 adjusts volume of the received audio stream to determine a left audio stream and a right audio stream to provide a sense of where the second position is in the three-dimensional virtual space relative to the first position. In one embodiment, audio processor 920 adjusts the volume based on a distance between the second position to the first position. In another embodiment, audio processor 920 adjusts the volume based on a direction of the second position to the first position. In yet another embodiment, audio processor 920 adjusts the volume based on a direction of the second position relative to the first position on a horizontal plane within the three-dimensional virtual space. In yet another embodiment, audio processor 920 adjusts the volume based on a direction where the virtual camera is facing in the three-dimensional virtual space such that the left audio stream tends to have a higher volume when the avatar is located to the left of the virtual camera and the right audio stream tends to have a higher volume when the avatar is located to the right of the virtual camera. Finally, in yet another embodiment, audio processor 920 adjusts the volume based on an angle between the direction where the virtual camera is facing and a direction where the avatar is facing such that the angle being more normal to where the avatar is facing tends to have a greater difference in volume between the left and right audio streams.

Audio processor 920 can also adjust an audio stream's volume based on the area where the speaker is located relative to an area where the virtual camera is located. In this embodiment, the three-dimensional virtual space is segmented into a plurality of areas. These areas may be hierarchical. When the speaker and virtual camera are located in different areas, a wall transmission factor may be applied to attenuate the speaking audio stream's volume.

Server 302 includes an attendance notifier 922, a stream adjuster 924, and a stream forwarder 926.

Attendance notifier 922 notifies conference participants when participants join and leave the meeting. When a new participant joins the meeting, attendance notifier 922 sends a message to the devices of the other participants to the conference indicating that a new participant has joined. Attendance notifier 922 signals stream forwarder 926 to start forwarding video, audio, and position/direction information to the other participants.

Stream adjuster 924 receives a video stream captured from a camera on a device of a first user. Stream adjuster 924 determines an available bandwidth to transmit data for the virtual conference to the second user. It determines a distance between a first user and a second user in a virtual conference space. And, it apportions the available bandwidth between the first video stream and the second video stream based on the relative distance. In this way, stream adjuster 924 prioritizes video streams of closer users over video streams from farther ones. Additionally or alternatively, stream adjuster 924 may be located on device 306A, perhaps as part of web application 310A.

Stream forwarder 926 broadcasts position/direction information, video, audio, and screen share screens received (with adjustments made by stream adjuster 924). Stream forwarder 926 may send information to the device 306A in response to a request from conference application 310A. Conference application 310A may send that request in response to the notification from attendance notifier 922.

Network interface 928 is a software or hardware interface between two pieces of equipment or protocol layers in a computer network. Network interface 928 transmits the model information to devices of the various participants. Network interface 928 receives video, audio, and screen share screens from the various participants.

Screen capturer 914, texture mapper 916, renderer 918, audio processor 920, attendance notifier 922, a stream adjuster 924, and a stream forwarder 926 can each be implemented in hardware, software, firmware, or any combination thereof.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for presenting in a virtual conference including a plurality of participants, comprising:

receiving data specifying a three-dimensional virtual space, wherein the three-dimensional virtual space comprises the plurality of participants and an avatar representing each of the plurality of participants;

receiving a presentation stream from a first client device of a first participant of the plurality of participants;

mapping the presentation stream onto a three-dimensional model of a presentation screen in the three-dimensional virtual space;

receiving a selection of the presentation screen from a second participant of the plurality of participants; and rendering for display to the second participant a two-dimensional view of the presentation stream overlaid on a view of the three-dimensional virtual space rendered from a perspective of a virtual camera of the second participant as the perspective of the second participant is continuously updated.

2. The computer-implemented method of claim 1, further comprising rendering the presentation stream onto the three-dimensional model of the presentation screen behind the two-dimensional view of the presentation stream in the three-dimensional virtual space.

3. The computer-implemented method of claim 1, wherein the selection is an input received by a second client device of the second participant.

4. The computer-implemented method of claim 1, wherein a communication server informs a second client device of the second participant of the presentation stream and the second client device requests the presentation stream from the communication server.

5. The computer-implemented method of claim 1, wherein the presentation stream comprises a first participant's view of the three-dimensional virtual space.

6. The computer-implemented method of claim 1, wherein the presentation screen comprises audio and video data captured by the first client device.

7. The computer-implemented method of claim 1, further comprising removing the presentation stream from the three-dimensional model of the presentation screen based on a position of the avatar of the second participant in the three-dimensional virtual space with respect to the three-dimensional model of the presentation screen or an input received by the first client device.

8. A non-transitory, tangible computer-readable device having instructions stored thereon that, when executed by at least one computing device, cause the at least one computing device to perform operations for presenting in a virtual conference including a plurality of participants, the operations comprising:

receiving data specifying a three-dimensional virtual space, wherein the three-dimensional virtual space comprises the plurality of participants and an avatar representing each of the plurality of participants;

receiving a presentation stream from a first client device of a first participant of the plurality of participants;

mapping the presentation stream onto a three-dimensional model of a presentation screen in the three-dimensional virtual space;

receiving a selection of the presentation screen from a second participant of the plurality of participants; and rendering for display to the second participant a two-dimensional view of the presentation stream overlaid on a view of the three-dimensional virtual space rendered from a perspective of a virtual camera of the second participant as the perspective of the second participant is continuously updated.

9. The device of claim 8, wherein the operations further comprise rendering the presentation stream onto on the three-dimensional model of the presentation screen behind the two-dimensional view of the presentation stream in the three-dimensional virtual space.

10. The device of claim 8, wherein the selection is an input received by a second client device of the second participant.

11. The device of claim 8, wherein a communication server informs a second client device of the second participant of the presentation stream and the second client device requests the presentation stream from the communication server.

12. The device of claim 8, wherein the presentation stream comprises a first participant's view of the three-dimensional virtual space.

13. The device of claim 8, wherein the presentation screen comprises audio and video data captured by the first client device.

14. The device of claim 8, wherein the operations further comprise removing the presentation stream from the three-dimensional model of the presentation screen based on a position of the avatar of the second participant in the three-dimensional virtual space with respect to the three-dimensional model of the presentation screen or an input received by the first client device.

15. A system for presenting in a virtual conference including a plurality of participants, comprising:

a processor coupled to a memory;

a network interface configured to (i) receive data specifying a three-dimensional virtual space, wherein the three-dimensional virtual space comprises the plurality of participants and an avatar representing each of the plurality of participants, (ii) receive a presentation stream from a first client device of a first participant of the plurality of participants, and (iii) receive a selection of a presentation screen from a second participant of the plurality of participants;

a texture mapper, implemented on the processor, configured to texture map the presentation stream onto a three-dimensional model of the presentation screen; and a renderer, implemented on the processor, configured to render for display to a second participant of the plurality of participants, the three-dimensional virtual space including a two-dimensional view of the presentation stream overlaid on a view of the three-dimensional virtual space rendered from a perspective of a virtual camera of the second participant as the perspective of the second participant is continuously updated.

16. The system of claim 15, wherein the renderer is further configured to render the presentation stream onto on the three-dimensional model of the presentation screen behind the two-dimensional view of the presentation stream in the three-dimensional virtual space.

17. The system of claim 15, wherein the selection is an input received by a second client device of the second participant.

18. The system of claim 15, wherein a communication server informs a second client device of the second participant of the presentation stream and the second client device requests the presentation stream from the communication server.

19. The system of claim 15, wherein the presentation stream comprises a first participant's view of the three-dimensional virtual space.

20. The system of claim 15, wherein the presentation screen comprises audio and video data captured by the first client device.

* * * * *